(12) United States Patent
Leary et al.

(10) Patent No.: US 10,410,178 B2
(45) Date of Patent: Sep. 10, 2019

(54) METHOD FOR GRAPHICAL PULL PLANNING WITH ACTIVE WORK SCHEDULES

(71) Applicant: Moca Systems, Inc., Newton, MA (US)

(72) Inventors: Daniel L. Leary, New Ipswich, NH (US); Michael N. Carr, Wilmington, MA (US); David W. Rolin, Carolina, RI (US)

(73) Assignee: Moca Systems, Inc., Boston, MA (US)

( * ) Notice: Subject to any disclaimer, the term of this patent is extended or adjusted under 35 U.S.C. 154(b) by 614 days.

(21) Appl. No.: 15/071,901

(22) Filed: Mar. 16, 2016

(65) Prior Publication Data
US 2017/0068932 A1 Mar. 9, 2017

Related U.S. Application Data
(60) Provisional application No. 62/133,524, filed on Mar. 16, 2015.

(51) Int. Cl.
*G06Q 10/06* (2012.01)
*G06Q 10/10* (2012.01)
*G06Q 50/08* (2012.01)

(52) U.S. Cl.
CPC ... *G06Q 10/103* (2013.01); *G06Q 10/063114* (2013.01); *G06Q 10/063116* (2013.01); *G06Q 50/08* (2013.01)

(58) Field of Classification Search
CPC .............................. G06Q 10/06; G06Q 10/10
(Continued)

(56) References Cited

U.S. PATENT DOCUMENTS

| 4,972,314 A | 11/1990 | Getzinger et al. |
| 5,019,961 A | 5/1991 | Addesso et al. |

(Continued)

FOREIGN PATENT DOCUMENTS

| EP | 0 329 911 A2 | 8/1989 |
| EP | 0 420 476 A2 | 4/1991 |

(Continued)

OTHER PUBLICATIONS

Decision on Appeal dated Jun. 10, 2016; for U.S. Appl. No. 12/538,537, 8 pages.
(Continued)

*Primary Examiner* — Nga B Nguyen
(74) *Attorney, Agent, or Firm* — Daly, Crowley, Mofford & Durkee LLP

(57) ABSTRACT

The present disclosure is directed to systems and methods for managing a pull-schedule. The system includes a schedule for completing at least one milestone, the schedule comprising an active schedule portion and a pull-schedule portion and one or more tickets that can be represented in the active schedule portion and/or the pull schedule portion, each ticket comprising a task to be completed to reach the at least one milestone. A scheduling service includes a pull column partitioning engine to scan the pull-schedule portion to define one or more columns with boundaries at the vertical positions that do not overlap with any tickets, a pull column assigning engine to assign the one or more tickets to a column and assign planned start and finish dates to the tickets, and a pull column activation engine to move a collection of a tickets contained in a pull column to the active schedule portion.

19 Claims, 16 Drawing Sheets

(58) Field of Classification Search
USPC .................................................. 705/7.15
See application file for complete search history.

(56) References Cited

U.S. PATENT DOCUMENTS

| | | | |
|---|---|---|---|
| 5,255,181 | A | 10/1993 | Chapman et al. |
| 5,295,065 | A | 3/1994 | Chapman et al. |
| 5,303,170 | A | 4/1994 | Valko |
| 5,369,570 | A | 11/1994 | Parad |
| 5,381,332 | A | 1/1995 | Wood |
| 5,546,564 | A | 8/1996 | Horie |
| 5,576,965 | A | 11/1996 | Akasaka et al. |
| 5,586,021 | A | 12/1996 | Fargher et al. |
| 5,692,125 | A | 11/1997 | Schloss et al. |
| 5,737,728 | A | 4/1998 | Sisley et al. |
| 5,761,674 | A | 6/1998 | Ito |
| 5,799,286 | A | 8/1998 | Morgan et al. |
| 5,826,252 | A | 10/1998 | Wolters, Jr. et al. |
| 5,881,283 | A | 3/1999 | Hondou et al. |
| 5,918,219 | A | 6/1999 | Isherwood |
| 5,923,552 | A | 7/1999 | Brown et al. |
| 6,115,646 | A | 9/2000 | Fiszman et al. |
| 6,216,098 | B1 | 4/2001 | Clancey et al. |
| 6,578,005 | B1 | 6/2003 | Lesaint et al. |
| 6,718,535 | B1 | 4/2004 | Underwood |
| 6,789,054 | B1 | 9/2004 | Makhlouf |
| 6,850,892 | B1 | 2/2005 | Shaw |
| 6,859,768 | B1 | 2/2005 | Wakelam et al. |
| 7,003,475 | B1 | 2/2006 | Friedland et al. |
| 7,006,977 | B1 | 2/2006 | Attra et al. |
| 7,054,934 | B2 | 5/2006 | Graupner et al. |
| 7,054,936 | B2 | 5/2006 | El Batt et al. |
| 7,058,587 | B1 | 6/2006 | Home |
| 7,171,375 | B2 | 1/2007 | Clarke |
| 7,212,987 | B2 | 5/2007 | Swanke et al. |
| 7,283,975 | B2 | 10/2007 | Broughton |
| 7,321,864 | B1 | 1/2008 | Gendler |
| 7,349,863 | B1 | 3/2008 | Pena-Mora et al. |
| 7,430,563 | B2 | 9/2008 | Mather |
| 7,752,017 | B1 | 7/2010 | Leary et al. |
| 8,078,487 | B2 | 12/2011 | Li et al. |
| 8,400,467 | B1* | 3/2013 | Ponce de Leon ............................ G06Q 10/06316 345/619 |
| 8,531,459 | B1* | 9/2013 | Ponce de Leon ...... G06Q 10/00 345/440 |
| 2001/0018670 | A1 | 8/2001 | Tan et al. |
| 2001/0034558 | A1 | 10/2001 | Hoskins |
| 2002/0049621 | A1 | 4/2002 | Bruce |
| 2002/0087381 | A1 | 7/2002 | Freeman et al. |
| 2002/0116239 | A1 | 8/2002 | Reinsma et al. |
| 2002/0193972 | A1 | 12/2002 | Kudo et al. |
| 2002/0198755 | A1 | 12/2002 | Birkner et al. |
| 2003/0018507 | A1 | 1/2003 | Flanagan |
| 2003/0018803 | A1 | 1/2003 | El Batt et al. |
| 2003/0033180 | A1 | 2/2003 | Shekar et al. |
| 2003/0083912 | A1 | 5/2003 | Covington, III et al. |
| 2003/0135401 | A1 | 7/2003 | Parr |
| 2003/0139917 | A1 | 7/2003 | Hardwick et al. |
| 2003/0171972 | A1 | 9/2003 | Heskin |
| 2005/0021713 | A1 | 1/2005 | Dugan et al. |
| 2005/0097012 | A1 | 5/2005 | Maeda |
| 2005/0171790 | A1 | 8/2005 | Blackmon |
| 2006/0044307 | A1 | 3/2006 | Song |
| 2006/0224432 | A1 | 10/2006 | Li |
| 2006/0277007 | A1 | 12/2006 | Wakelam et al. |
| 2007/0067196 | A1 | 3/2007 | Usui |
| 2007/0150329 | A1 | 6/2007 | Brook et al. |
| 2007/0174101 | A1 | 7/2007 | Li et al. |
| 2007/0245300 | A1* | 10/2007 | Chan ...................... G06Q 10/06 717/105 |
| 2008/0126945 | A1* | 5/2008 | Munkvold ............. G06Q 10/06 715/733 |
| 2008/0195452 | A1* | 8/2008 | Ponce de Leon ...... G06Q 10/06 705/7.12 |
| 2009/0133027 | A1* | 5/2009 | Gunning ................ G06Q 10/06 718/103 |
| 2009/0171718 | A1 | 7/2009 | Barlow et al. |
| 2009/0204463 | A1 | 8/2009 | Burnett et al. |
| 2009/0254407 | A1* | 10/2009 | Fagan .................... G06Q 10/06 705/7.23 |
| 2010/0010856 | A1 | 1/2010 | Chua et al. |
| 2011/0035244 | A1* | 2/2011 | Leary .................... G06Q 10/00 705/7.13 |
| 2012/0130907 | A1* | 5/2012 | Thompson ........... G06Q 10/103 705/301 |
| 2012/0304187 | A1* | 11/2012 | Maresh .............. G06Q 10/0631 718/103 |
| 2013/0151421 | A1* | 6/2013 | Van Der Ploeg ...... G06Q 10/06 705/301 |
| 2014/0257906 | A1* | 9/2014 | Soubra ............... G06Q 10/1097 705/7.21 |
| 2015/0254598 | A1* | 9/2015 | Engels ........... G06Q 10/063114 705/2 |
| 2015/0339619 | A1* | 11/2015 | Dumont .......... G06Q 10/06311 705/7.16 |

FOREIGN PATENT DOCUMENTS

| | | | |
|---|---|---|---|
| EP | 0 763 808 | A2 | 3/1997 |
| EP | 0 803 823 | A2 | 10/1997 |
| EP | 1 158 782 | A2 | 11/2001 |
| EP | 1 160 701 | A1 | 12/2001 |
| EP | 1 204 059 | A2 | 5/2002 |
| EP | 1 324 248 | A2 | 7/2003 |
| EP | 1 145 555 | B1 | 2/2004 |
| EP | 1 387 267 | A1 | 2/2004 |
| EP | 1 947 598 | A2 | 7/2008 |
| WO | WO 89/03786 | | 5/1989 |
| WO | WO 2007/109030 | A2 | 9/2007 |

OTHER PUBLICATIONS

Non-Final Office Action dated Jan. 5, 2016; for U.S. Appl. No. 10/264,190; 23 pages.

U.S. Appl. No. 10/264,190, filed Oct. 3, 2002, Leary et al.

AbouRizk, et al.; "Simphony—An Integrated Environment for Construction Simulation;" Proceedings of the 2000 Winter Simulation Conference, Joines, et al, eds. Jan. 2000; pp. 1907-1914 (8 pages).

AbouRizk, et al.; "State of the Art in Construction Simulation;" Proceedings of the 1992 Winter Simulation Conference, Swian, et al., eds.; Jan. 1992; pp. 1271-1277 (7 pages).

Fischer, et al.; "Representing Project Information and Construction Method Knowledge for Computer-Aided Construction Management;" Constriction Informatics Digital Library, Jan. 1995; pp. 404-414 (11 pages).

Foresight Systems, Inc.; http://www.foresightsystems-mands.com/; Jan. 2005; 1 page.

Gates, et al. "Construction—CAE: Integrated Planning and Cost Control;" American Association of Cost Engineers, Jan. 1989; pp. C.2.1-C.2.4 (4 pages).

Harmonosky; "Simulation-Based Real-Time Scheduling: Review of Recent Developments;" Proceedings of the 1995 Winter Simulation Conference, Alexopoulos, et al., eds.; Jan. 1995; pp. 220-225 (6 pages).

Isidore, et al. "Integrated Range Estimating and Stochastic Scheduling;" 1999 AACE International Transactions, Jan. 1999; 4 pages.

Karim, et al.; "OO Information Model for Construction Project Management;" Journal of Construction Engineering and Management, Sep.-Oct. 1999; pp. 361-367 (7 pages).

Longworth; "Evolving Project Control Practices;" AACE International Transactions, Jan. 2002; 12 pages.

Love, et al.; "Using Systems Dynamics to Better Understand Change and Rework in Construction Project Management Systems;" International Journal of Project Management 20, Jan. 2002; pp. 425-436 (12 pages).

Ma et al.; "Application of 4D for Dynamic Site Layout and Management of Construction Projects;" Automation in Construction 14; Jan. 2005; pp. 369-381 (13 pages).

(56) References Cited

OTHER PUBLICATIONS

Maruyama, et al.; "Development of Virtual and Real-Field Construction Management Systems in Innovative, Intelligent Field Factory;" Automation in Construction 9, Jan. 2000; pp. 503-514 (12 pages).
"New Generation in Capital Program & Construction Management;" Moca Systems, Inc. Confidential & Propriety, Nov. 2007; pp. 1-22 (22 pages).
Orsoni, et al.; "The Role of Modelling and Simulation in Design-Build Projects;" Proceedings 20$^{th}$ European Conference on Modelling and Simulation, Jan. 2006; 6 pages.
"Ptolemy II;" http://ptolemy.eecs.berkeley.edu/ptolemyll/main.htm ; Jan. 2005; 4 pages.
Retik, et al. "VR-Based Planning of Construction Site Activities;" Automation in Construction 8, Jan. 1999; pp. 671-680 (10 pages).
"Simulation and Modeling;" CACI Products Company, Jan. 2005; 2 pages.
Staub, et al.; "Industrial Case Study of Electronic Design, Cost, and Schedule Integration;" Stanford University, Jan. 2001; pp. 1-18 (18 pages).
Tommelein; "Discrete-Event Simulation of Lean Construction Processes;" University of California, Berkeley, Jan. 1997; pp. 121-136 (16 pages).
U.S. Appl. No. 12/538,537, filed Aug. 10, 2009 entitled "Project Management System for Integrated Project Schedules".
U.S. Appl. No. 10/264,190, filed Oct. 3, 2002 entitled "Method for Providing a Construction Project Plan".
U.S. Appl. No. 15/232,112, filed Aug. 9, 2016, Leary et al.

\* cited by examiner

| Ticket | X Range |
|---|---|
| A | [570,861) |
| B | [520,811) |
| C | [568,859) |
| D | [1022,1313) |
| E | [1062,1353) |
| F | [1550,1841) |
| G | [1513,1804) |

METHOD FOR GRAPHICAL PULL PLANNING WITH ACTIVE WORK SCHEDULES

CROSS-REFERENCE TO RELATED APPLICATION

The present application claims the benefit of U.S. Provisional Application No. 62/133,524, titled "Graphical Pull Planning With Active Work Schedules," filed on Mar. 16, 2015. The entire disclosure of which is incorporated by reference herein in its entirety.

FIELD

The disclosed technology relates to project management systems that facilitate the use of the Lean Project Management technique known as pull planning, and provides a means for progressively converting a pull plan to a working schedule that is easily and actively managed. The disclosed technology is compatible with other project management techniques including Critical Path Method (CPM) scheduling and is compatible with Lean Project Management techniques other than pull planning.

BACKGROUND

Planners at construction site often create pull plans by organizing sticky notes on a wall. The planners collaborate to come up with a high level schedule by placing and moving the sticky notes along a timeline until agreement is reached by the planners.

SUMMARY

The principles and techniques of Lean production have been applied in the field of project management with growing success and popularity in recent years. In particular, Lean principles and techniques have been applied successfully in the construction industry to better manage construction projects.

Among the Lean techniques used to manage construction projects (or other types of projects) is the technique of pull planning wherein a team of participants directly responsible for performing or supervising a set of work activities collaborate to reach an agreed upon pull plan that culminates in the completion of a specific milestone of a project. A pull plan may be both created by different methods from those used to create a traditional CPM style project plan and the data that constitutes the pull plan is also structured differently from a traditional CPM plan. A pull plan, for instance, can generally be derived in reverse order of schedule time, working backwards or pulling activities from a final milestone which defines the deliverables of the plan. The intention is that earlier activities provide the required antecedent conditions for later activities in as close to just in time fashion as practical. Pull planning is a component of the Last Planner® System as described the Lean Construction Institute.

Currently, a commonly used method to practice pull planning consists of writing information in longhand directly onto paper sticky notes and positioning the sticky notes on a large surface accessible to all the pull planning team members, such as on an interior wall of a job site trailer. Software systems which facilitate the pull planning process have not become common. This may be due to software methods that do not achieve an acceptable level of collaboration and live interpersonal cooperation as the sticky notes on the wall method. However prior software systems have also failed to provide a solution to one of the shortcomings of the sticky notes on the wall method of pull planning, namely the difficulty of transitioning from the planning phase through the execution phase of a pull plan, where day to day activities and unforeseen contingencies must be managed in conjunction with the performance of the work described by the plan.

The presently disclosed technology describes a method and functions in a software system with a graphical user interface for creating a pull plan graphically and progressively converting that pull plan into a schedule of work activities that is easily modified and depicted graphically in order to manage the execution of the plan. Both the creation of the pull plan and its conversion into a schedule of work activities can take place in a single collaborative multi-user software environment. The same team that assembled the plan is able to manage execution of the plan on a day to day basis using the system. The visual metaphor of sticky notes on a wall which is already well understood by pull planning practitioners can be implemented in the graphical user interface and extended in ways that are difficult or impossible to implement using paper sticky notes.

One advantage of the disclosed technology its ability to deliver greater value than prior methods for projects using Lean project management techniques such as pull planning, which in turn leads to more efficient and less wasteful outcomes for those projects.

A method is described of graphically depicting a pull plan comprised of a plurality of tickets, wherein each ticket may represent a planned activity of the plan. Functions are described which allow users to construct and modify a pull plan using a graphical interface. Each plan may have an associated milestone and a two dimensional graphical visual space in which tickets may be positioned relative to one another. Each ticket in the plan may also have associated with it a duration representing the time required to perform the work represented by that ticket. A method is described by means of which the system partitions tickets of the plan into pull columns and thereby calculates planned start and finish dates for each ticket, for each column, or for both tickets and columns.

Furthermore, a method is described for partitioning the plan space into an active space and a pull space by means of identifying an active line and associated active date. Methods are described for moving tickets within each space and between the pull and active spaces. A method is described for progressively moving tickets from pull space to active space by activating a pull column. A method is described, whereby the system calculates planned start and planned finish dates for tickets in the plan, based on the location of the ticket in active space or pull space. Finally, a method is described whereby the system determines of a plan having an active space if the plan is on schedule, ahead of schedule, or behind schedule and if so by What duration.

In one aspect, the present disclosure is directed towards a computer-implemented system for implementing a pull-schedule for use in generating scheduling information for use in a construction project, for example. The system includes a display replicated in real time on one or more computers communicating over a network and a schedule for completing at least one milestone. In an embodiment, the schedule includes an active schedule portion and a pull schedule portion. The system further includes one or more tickets that can be represented in the active schedule portion or in the pull schedule portion or individually in both the active schedule portion and the pull schedule portion. Each ticket includes a task to be completed to reach the at least one milestone and each of the tickets have an associated duration and a left edge value, and a width. The system further includes a pull column partitioning engine to scan pull schedule portion to identify vertical positions in the schedule that do not overlap with any tickets and define one or more columns with boundaries at those positions that do not overlap with any tickets, a pull column assigning engine to assign the one or more tickets in a column to the respective column and to assign planned start and end dates to the column and to the tickets therein, and a pull column activation engine to reassign the one or more tickets in one or more pull columns to the active schedule portion of the plan and to change the width if necessary of each of said tickets to correspond to the duration of that ticket.

In some embodiments, the pull column activation engine can be configured to identify one or more pull columns each containing one or more tickets and reassign those tickets from the pull portion of the plan to the activate schedule portion of the plan in response to a user command. The system can further include a dependency engine for maintaining dependencies between tickets one or both of which is in the pull schedule space or the active schedule space.

In an embodiment, the pull-column partitioning engine is configured to establish a new pull column in response to a user moving a ticket to a position in the plan that overlaps vertically with no other tickets. The pull-column partitioning engine can be configured to move a ticket from a first pull column to a second column in response to a user command. In some embodiments, the pull column assigning engine is configured to assign the ticket to a new position within the second column, establishing a new order in the second column responsive to the move. The pull-column partitioning engine can be configured to remove any pull column from the schedule when that pull column no longer contains any tickets.

In some embodiments, the pull-column partitioning engine can be configured to assign a start date and a finish date to the one or more tickets without changing a position of the one or more tickets in their respective pull column.

In an embodiment, each pull column defines a specific time period. Further, one or more tickets may have the same width but different durations. In other embodiments, one or more tickets may have different widths, and their respective width may be based upon a ticket duration.

In some embodiments, one or more tickets have a different start position in the column relative to another ticket in the same column and the start position of a ticket along an x-axis may be based upon a start date associated with the ticket.

In another aspect, the present disclosure is directed towards a method for managing a pull-schedule. The method includes receiving input parameters through an input interface. The input parameters can include ticket information for a schedule for completing at least one milestone, the schedule comprising an active schedule portion and a pull schedule portion. In an embodiment, the input interface can be replicated in real time on one or more computers communicating over a network. The method further includes generating one or more pull columns within the schedule responsive to the ticket information. In an embodiment, the ticket information may include a position value for one or more tickets in the pull-schedule.

The method further includes determining positions for the one or more tickets within the one or more pull columns relative to an active line. The active line may define a boundary between the active schedule portion and the pull schedule portion, where each of the one or more tickets comprises a task to be completed to reach the at least one milestone. The tickets can have an associated duration and a left edge value, and a width. The method further includes displaying the one or more tickets in the one or more pull columns according to each of the one or more tickets left edge value.

In some embodiments, the method includes moving a ticket from the active schedule portion to the pull schedule portion, or vice versa, in response to a user command. The method may include assigning a start date and a finish date to the one or more tickets without changing a position of the one or more tickets in in their respective column. In some embodiments, the method includes moving one or more tickets within one or more pull columns to the active schedule portion. The method may include moving the one or more tickets within the one or more pull columns to the active schedule portion in response to a user command.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

The present disclosure is directed towards a project management system that facilitates a real-time approach to generating and managing a work schedule using pull planning techniques.

In the past, many construction projects used paper sticky notes positioned on a wall to actively manage the project. Although variations exist among specific techniques used, each sticky note typically represents some unit of planned work and has an associated duration of time required to complete the work. Time progresses in the plan from left to right. Sticky notes are often arranged in columns to represent work that can be performed concurrently. The color of a sticky note is often used to associate the work of that sticky note with a particular crew or resource. Thus, the present disclosure provides a computer implemented project management system that allows one or more users to actively interact with a particular work plan schedule, including an active schedule, to manage the work plan in real-time.

Figure 1:
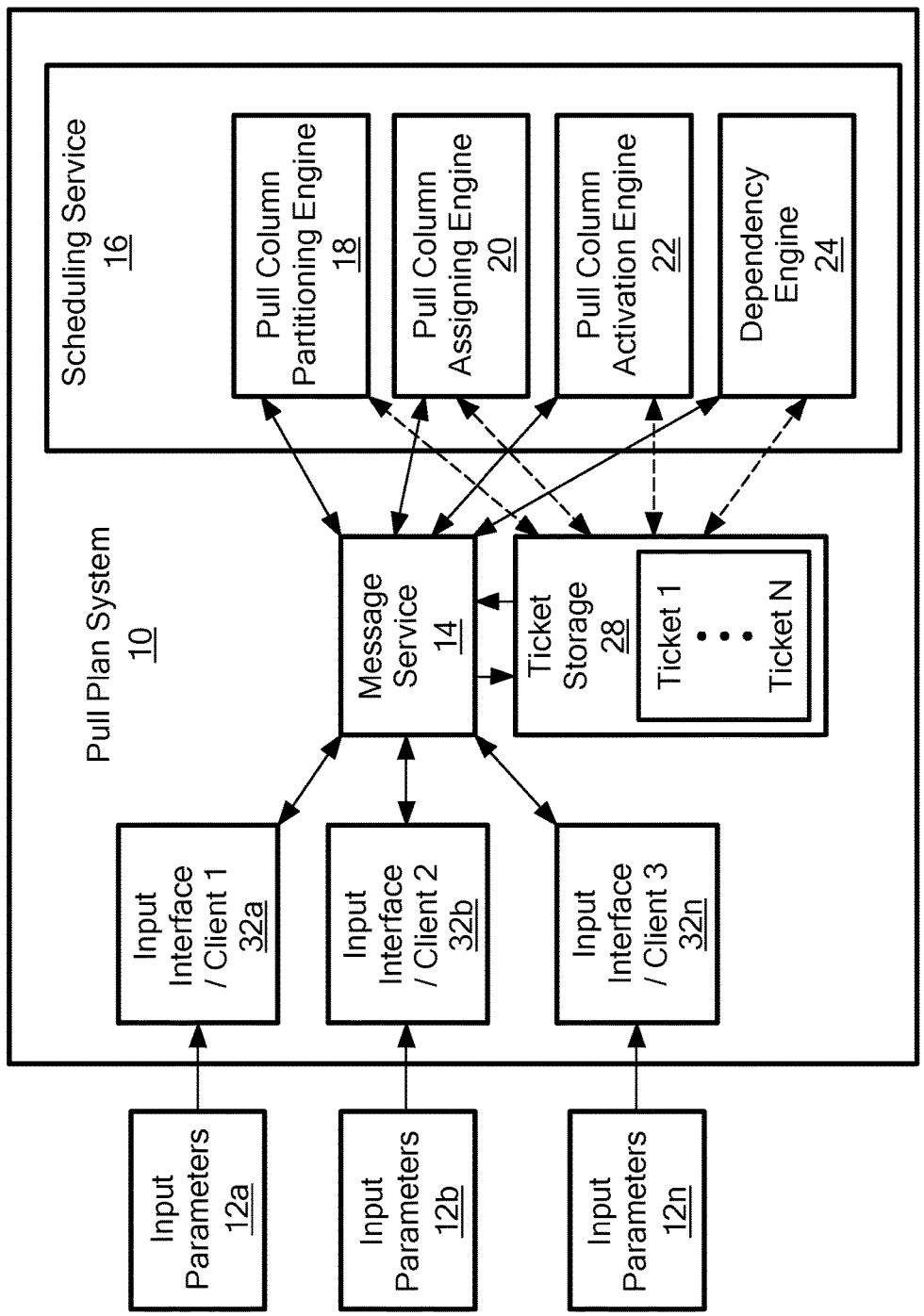
FIG. 1 is a block diagram of a pull plan system.

Now referring to FIG. 1, a pull plan system 10 includes a message service 14, a scheduling service 16, a ticket storage (e.g., a memory or database) 28, a pull column partitioning engine 18, a pull column assigning engine 20, a pull column activation engine 22 and a dependency engine 24.

In an embodiment, the pull plan system 10 can be configured to receive input parameters 12a-12n from the plurality of clients through one or more input interfaces 32a-32n. For example, a first client (i.e., user) may enter a first set of input parameters 12a through a first input interface 32a (e.g., client browser) and the message eservice 14 can be configured to transmit (e.g., broadcast) the first set of input parameters 12a to the scheduling service 16. The input parameters can include information about tickets such as but not limited to ticket positions values (e.g., x-y values in a pull plan space). In some embodiments, the input parameters correspond to a user moving a ticket between pull columns in a pull plan or otherwise changing a position of a ticket within a pull plan.

In an embodiment, the input interface 32 may be a graphical user interface (GUI) or display device that allows users to interact with the pull plan system 10. In some embodiments, the input interface 32 may be an application (e.g., real-time web application) executing on a commuting system or a message service. Thus, the pun plan system 10 may be executing on a desktop, laptop, tablet, smartphone or similar device to allow users to access the pull plan system 10 from a variety of locations.

In some embodiments, the input interface 32 can be configured to display to the user an existing plan that is a schedule of work activities for completing a milestone. The input interface 32 can be configured to allow the user to modify the existing plan (e.g., moving tickets in real-time to different pull columns, modifying start and completion dates, etc.).

In some embodiments, the input interface 32 includes or can be communicatively coupled to a wide variety of I/O devices to allow a use to interact with the pull plan system 10. For example, input devices may include keyboards, mice, trackpads, trackballs, microphones, touch screens and drawing tablets.

In some embodiments, the input interface 32 may be an output interface configured to display to the user a plan that is a schedule of work activities having the appropriate tickets and pull columns based on the received input parameters 12. For example, the input interface 32 may be configured to display a plan having one or more tickets positioned within various pull columns and having associated start date, duration and completion date. The input interface 32 can include or be communicatively coupled to a wide variety of I/O devices to allow a user to interact with the scheduling system. For example, output devices may include video displays, speakers, and various types of printers. In some embodiments, the output interface 26 and the input interface 14 are a single component and display device.

In an embodiment, the plurality of input interfaces 32a-32 are communicatively coupled (e.g., via interact connections) to the message service 14. The message service 14 can host a set of topics associated with one or more pull plans. The message service 14 can be communicatively coupled to the ticket storage 28 (e.g., persistent storage, a database). The message service 14 may store ticket information or published messages from one or more clients to the ticket storage 28. The message service 14 is communicatively coupled to the scheduling service 16.

The scheduling service 16 can receive the ticket information from the message service 14, process it and be configured to generate pull plans and scheduling information. Schedule information may include but not limited to determining plan durations based on the received parameters, determining a number of pull columns necessary for a particular plan, generating the pull columns, and calculating start and completion dates for tickets and/or pull columns in a pull plan.

In some embodiments, the scheduling service 16 can be configured to partition tickets of a respective plan (e.g., work plan) into pull columns and determine plan start dates and completion dates for each ticket, for each column and/or for the entire plan. In some embodiments, the scheduling service 16 can calculate start dates and completion dates based on the position of a respective ticket or pull column.

The scheduling service 16 can be configured to determine if a plan is on schedule, ahead of schedule, or behind schedule. In some embodiments, the scheduling service 16 can be configured to move tickets within each space, such as a pull column or to different pull columns or from pull space to active space and vice versa.

In some embodiments, the scheduling service 16 is communicatively coupled with the ticket storage 28. The scheduling service 16 can transmit and store the received ticket information and/or generated tickets in the ticket storage 28. Further, the scheduling service 16 can retrieve the ticket information from the ticket storage 28 to generate a plan requested by a user or modify an existing plan based on a user request.

In an embodiment, the scheduling service 16 is communicatively coupled with each of the pull column partitioning engine 18, the pull column assigning engine 20, the pull column activation engine 22, and the dependency engine 24. In some embodiments, one or more of the pull column partitioning engine 18, the pull column assigning engine 20, the pull column activation engine 22, and the dependency engine 24 may be sub-components or modules of the scheduling service 16. In other embodiments, they may be separate components within the pull plan system 10.

The scheduling service 16 is configured to transmit the scheduling information to each of the pull column partitioning engine 18, the pull column assigning engine 20, the pull column activation engine 22, and the dependency engine 24.

In some embodiments, the ticket storage 28 is communicatively coupled with each of the pull column partitioning engine 18, the pull column assigning engine 20, the pull column activation engine 22, and the dependency engine 24 and is configured to transmit ticket information to each of them.

In an embodiment, the pull column partitioning engine 18 is configured to scan a pull schedule portion to identify positions in the schedule that do not overlap with any tickets and define one or more columns with boundaries at the positions that do not overlap with any tickets.

In an embodiment, the pull column assigning engine 20 is configured to assign one or more tickets in a column to the respective column. The tickets may be assigned start and/or completion dates based upon that column assignment.

In an embodiment, the pull column activation engine 22 is configured to assign the one or more tickets in a single pull column to the active schedule portion of the plan. In other embodiments, the pull column activation engine 22 is configured to move the one or more tickets contained in two or more pull columns to the active schedule portion of the plan in response to a user command. In some embodiments, the pull column activation engine 22 is configured to change the width of the tickets in the active portion of the plan to correspond to a duration of the ticket, and display the tickets with the changed width in the active schedule portion. In one embodiment, the pull column activation engine 22 can be configured to activate individual tickets by moving those tickets from a pull space to an active space.

In an embodiment, the dependency engine 24 is configured to maintain dependencies between tickets one or both of which is in the pull schedule space to the active schedule space.

In some embodiments, each of the pull column partitioning engine 18, the pull column assigning engine 20, the pull column activation engine 22, and the dependency engine 24 are communicatively coupled with the output interface 26 to transmit the scheduling information.

Now referring to FIGS. 1A-1E, in which like elements are provided having reference designations throughout several views, illustrative embodiments of the interaction between the clients 32a-32n, message service 14 and scheduling service 16 are provided.

Figure 1A:
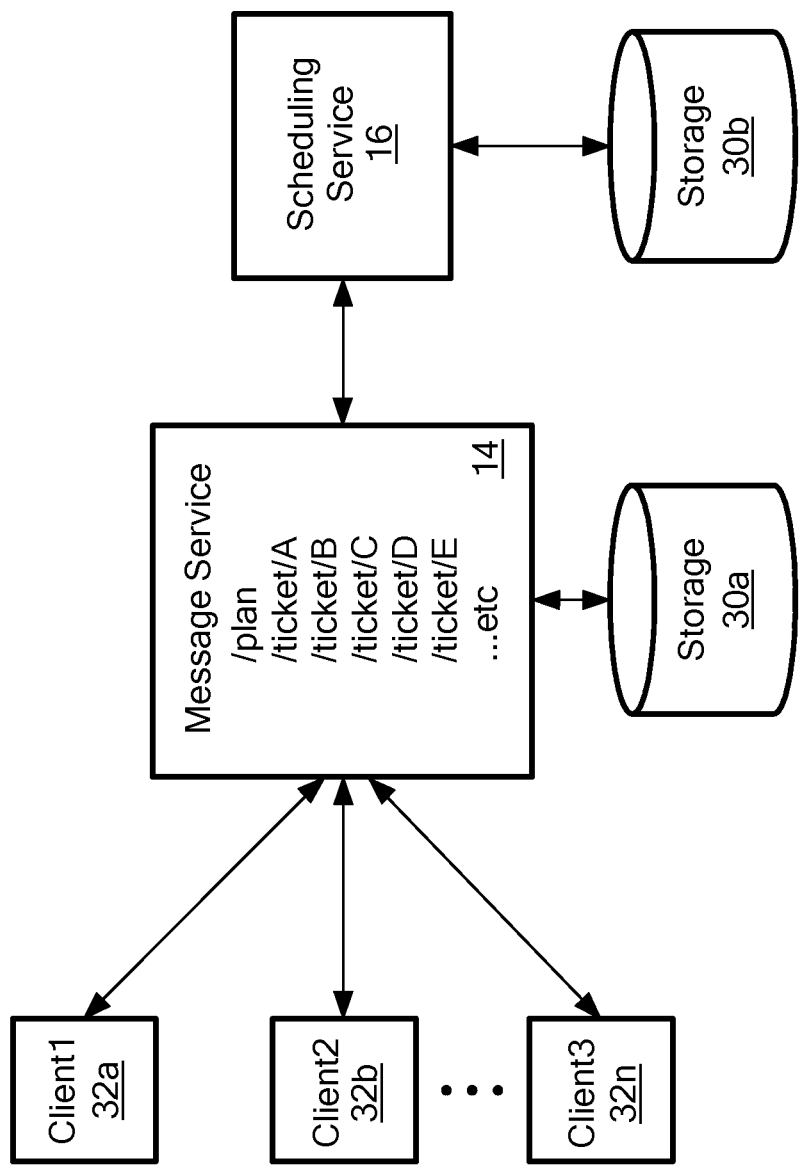
FIG. 1A is a block diagram of an embodiment of the pull plan system of FIG. 1 interacting with a plurality of clients.

Now referring to FIG. 1A, a pull plan system 10 includes a message service 14 communicatively coupled to a scheduling service 16. The message service 14 and the scheduling service 16 are each coupled to storage databases 30a, 30b respectively. In an embodiment, a plurality of clients (also referred to herein as users) 32a-32n can interact with the message service 14 to edit tickets in an existing pull plan and/or active plan (i.e. in real time so that other users can see the changes to the schedule as they occur. This may allow the users to work together to create the schedule, even though the users may be in different locations. Input parameters received from one or more of the clients 30a-30n may be transmitted from the message service 14 to the scheduling service 16. In an embodiment, the scheduling service 16 is configured to edit existing pull plans and active plans based on the received input parameters. The revised pull plans and active plans can then be displayed to any user of the pull plan system 10.

In some embodiments, the message service 14 is a web application using an asynchronous publish/subscribe message service. This style of real-time web application is sometimes called a reactive or real time web application. The clients 32a-32n represent, for instance, web browsers, each associated with a user and running on a desktop, laptop, tablet, smartphone or similar device. The clients 32a-32n are connected via internet connections to the message service 14 which hosts a set of topics associated with a specific pull plan and/or active plan.

As stated above, the scheduling service 16 is communicatively coupled to the message service 14. In an embodiment, the scheduling service 16 (also referred to as the plan scheduler service) is the portion of the pull plan system 10 responsible for calculating planned dates in the active and pull spaces of the plan and for performing the activate-pull-column operation as previously described. The message service 14 and network connections (e.g. via web socket connections) may support an asynchronous publish/subscribe protocol.

In an embodiment, the topics served by the message service 14 as shown may be organized hierarchically. There can be a plan topic associated with attributes of the plan, such as the milestone target and schedule dates, the position and date of the active line, etc. Likewise, topic/ticket A may be associated with all the individual attributes of ticket A. One or more of the clients 32a-32n or the scheduling service 16 may perform manipulations of data in the plan by means of publishing an appropriate message to a corresponding topic. We assume for purposes of the illustrative embodiment of FIG. 1A that the clients 32a-32n (i.e., Client1, Client2 and Client3) are in the control of three different users, and these users are all connected to the message service 14 for purposes of viewing and modifying the plan, hence they are all subscribed to all relevant topics of the plan including topics for the tickets therein. By means of their subscriptions to all the topics, the message service 14 has already published messages on all topics to all the clients 32a-32n representing the current state of the plan, such as a plan shown in FIGS. 6-14.

Figure 1B:
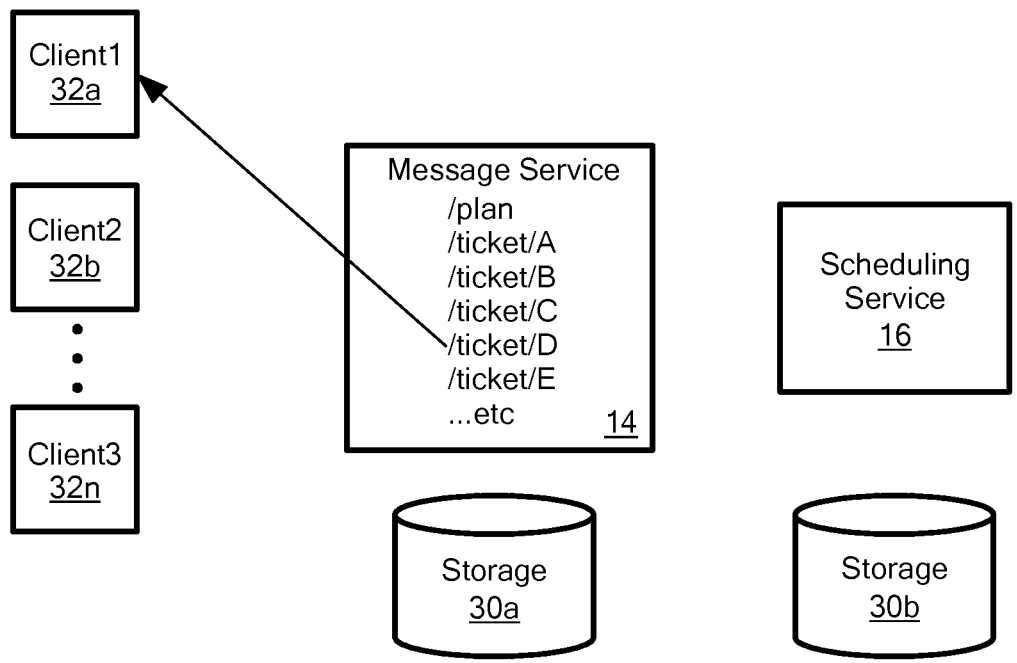
FIG. 1B is a block diagram of a client publishing to a message service of the pull plan system of FIG. 1.

For example, and now referring to FIG. 1B, a user at the first client 32a (i.e., client1) may determine that a behind schedule condition can be remedied by assigning additional crew resources to ticket D and thereby reducing its duration to 2 days. Thus, the first client 32a transmits a message to that effect to the message service 14. The message is specifically published by the first client 32a to the /ticket/D topic at the message service 14.

Figure 1C:
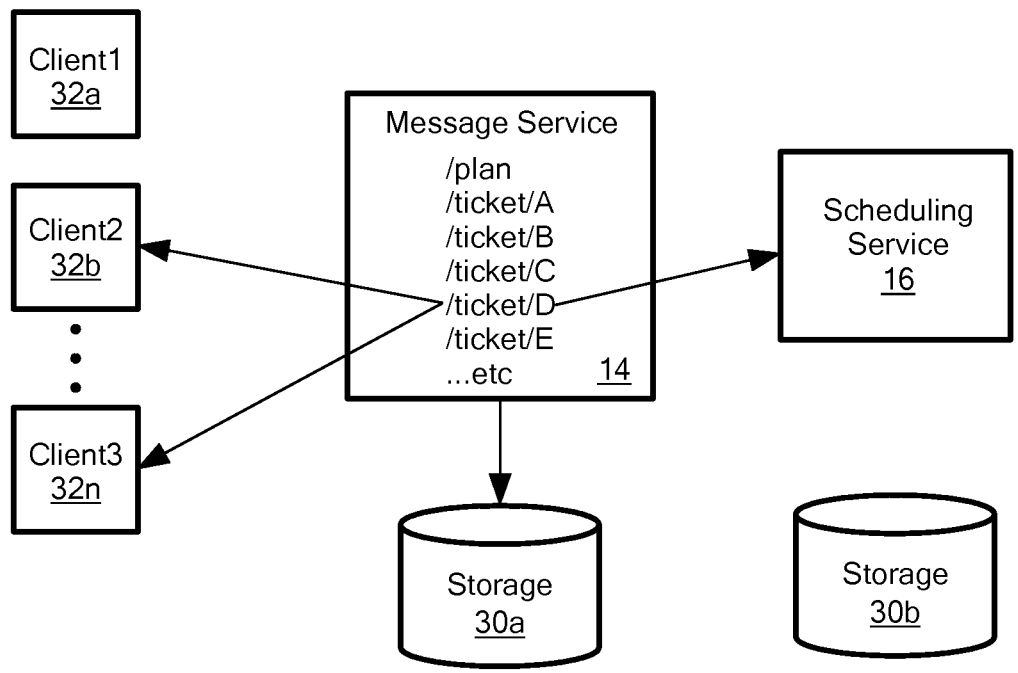
FIG. 1C is a block diagram of the message service of the pull plan system of FIG. 1 broadcasting a message to a scheduling service and a plurality of clients.

Now referring to FIG. 1C, the message service 14 can respond the newly published message by storing it in the storage 30a (e.g., persistent storage, database) and broadcasting it to all subscribers of the /ticket/D topic. For example, since the first client 32a (i.e., client1) published the message, the message is forwarded to the remaining clients 32b-32n (here client2 and client3) and to the scheduling service 16.

Figure 1D:
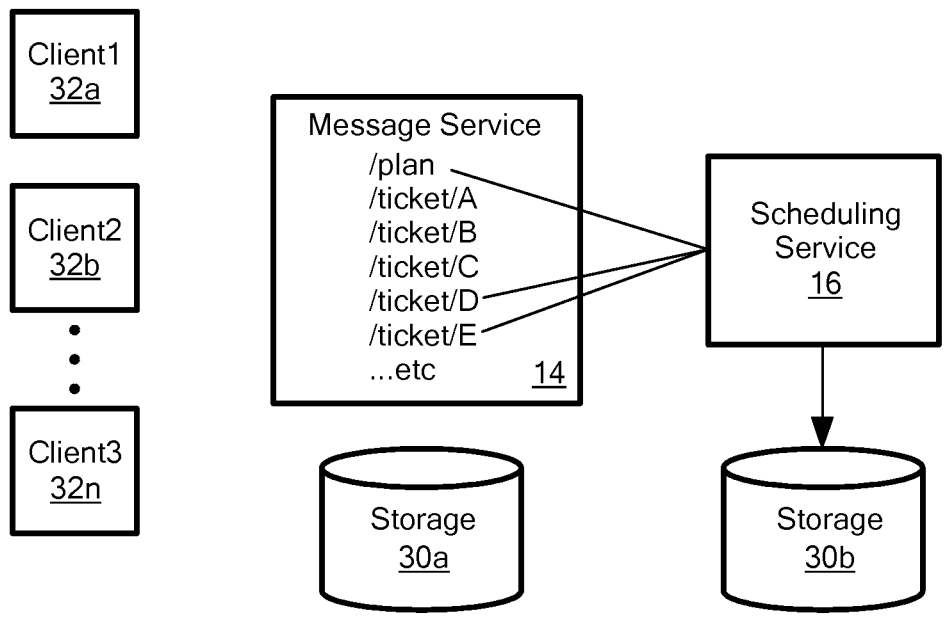
FIG. 1D is a block diagram of a scheduling service of the pull plan system of FIG. 1 generating a new schedule responsive to a message from one or more clients.

Now referring to FIG. 1D, the scheduling service 16 may determine that the particular change to ticket D requires a rescheduling of planned dates in the plan. The scheduling service 16 may react to each individual notification that it receives about the plan, or it may buffer individual messages and respond with a schedule calculation only after some predetermined threshold is reached. The threshold could be time based or activity based or determined by other means. If it responds after multiple messages have been received, the scheduling service 16 may combine those messages to determine their aggregate effect on the plan. At some point in time the scheduling service 16 can perform the pull plan calculation as previously described and determines which aspects of the plan are thereby affected. In the illustrative embodiment of FIG. 1D, the scheduling service 16 has determined that tickets D and E are to be assigned new planned finish dates and the plan milestone target and schedule dates will now coincide. Messages to this effect are published by the scheduling service 16 to the message service 14 at the appropriate topics.

Figure 1E:
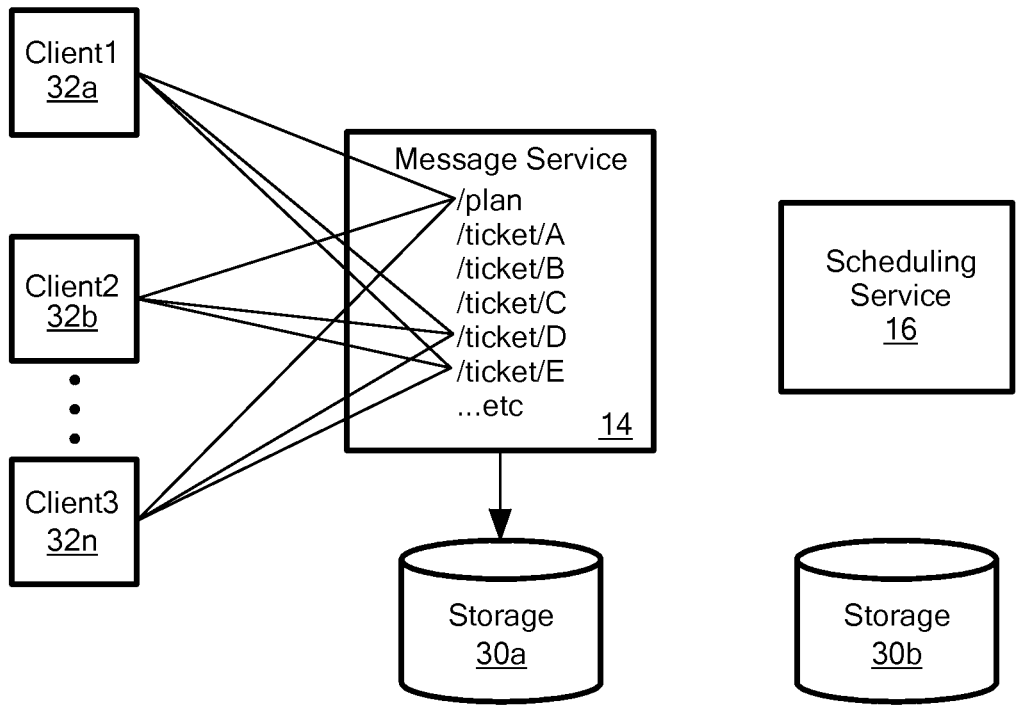
FIG. 1E is a block diagram of the message service of the pull plan system of FIG. 1 generating new messages to one or more clients indicating a change to a schedule.

Now referring to FIG. 1E, the clients 32a-32n (subscribers client1, client2, and client3) can all receive these new messages. Thus, the message service 14 (e.g., web browser) updates the display being shown to each respective user, making the user aware of the newly calculated schedule. In an embodiment, since the message service is asynchronous, each subscribed client receives the new messages as soon as the message service 14 and the scheduling service 16 are able to process the entire sequence of events. Hence each user is kept continuously aware both of changes by other users and changes made by the scheduling methods, which contributes greatly to the collaborative nature of the pull planning process.

Figure 2:
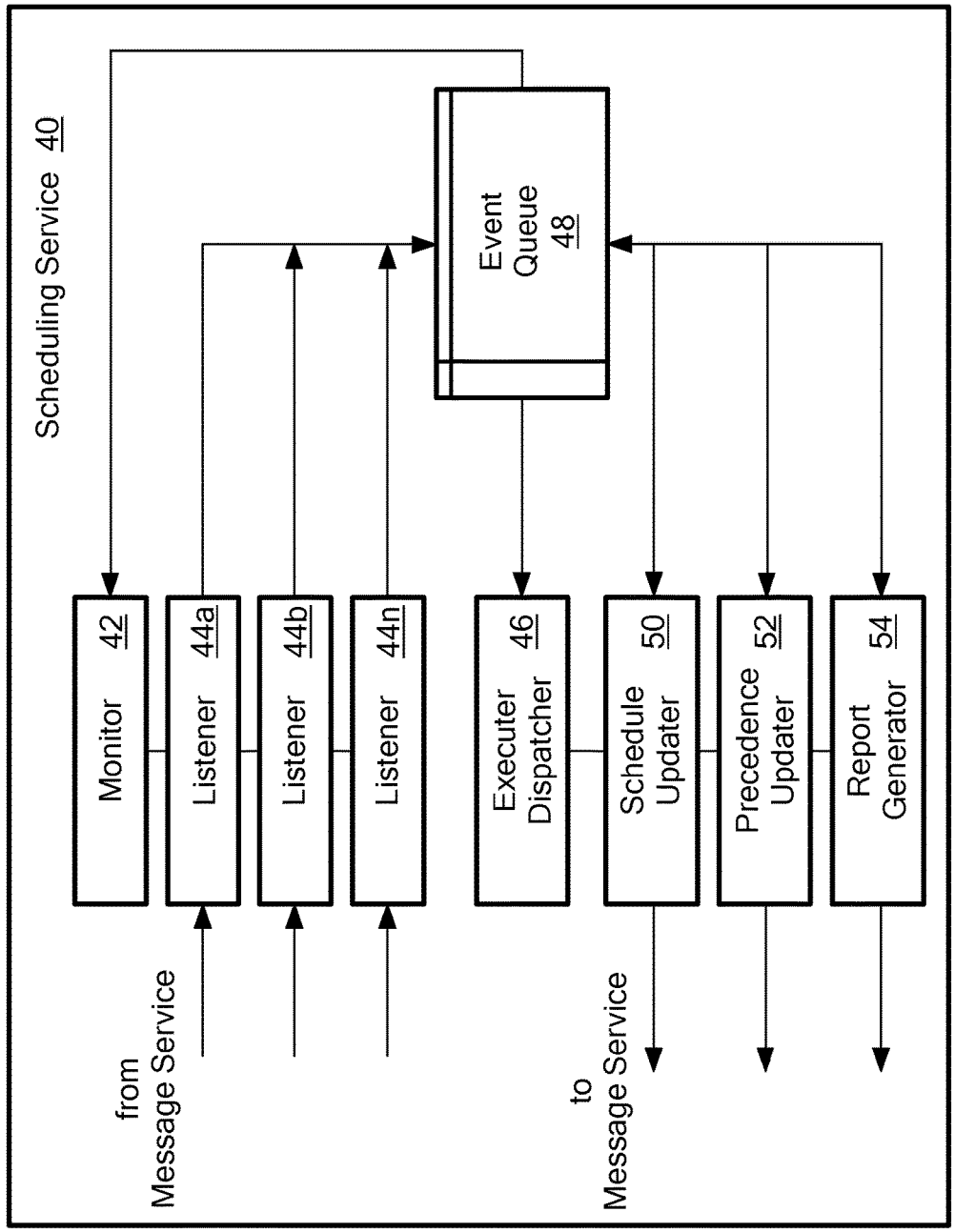
FIG. 2 is a block diagram of an embodiment of a scheduling service of the pull plan system of FIG. 1.

Now referring to FIG. 2, a scheduling service 40 may include a monitor 42, a plurality of listeners 44a-44n, an executor dispatcher 46, an event queue 48, a schedule updater 50, a precedence updater 52 and a report generator 54. The scheduling service 40 may the same as the scheduling service 16 discussed above with respect to FIGS. 1-1E.

In an embodiment, the monitor 42 component monitors the event queue 48 to determine if new listeners 44a-44n should be started or existing listeners 44a-44n terminated for a given input interface (i.e., message service). For example, when a new input interface is available, the monitor 42 may run one or more listeners 44a-44n on multiple threads which subscribe to topics in the input interface relevant to each pull plan being monitored, including tickets in each plan, dates and positions as assigned by the user, etc. When one or more listeners 44a-44n receive messages relevant to the scheduling modification or any type of service performed by the scheduling service 40, the incoming messages are recorded in the persistent event queue 48 internal to the scheduling service 40. An executor dispatcher 46 may monitor for incoming events in the event queue 48 independently of the monitor 42 component. In some embodiments, the executor dispatcher 46 periodically compares incoming events which have accumulated since the most recent response was made to determine when a scheduling response, a precedence response, a report generation response, or another such response is required. In an embodiment, when this occurs, the executor dispatcher 46 can construct appropriate response components and dispatches them on multiple threads of execution. For example, the executor dispatcher 46 may use one or more of the schedule updater 50, the precedence updater 52 and/or the report generator 54 to dispatch response components.

Figure 2A:
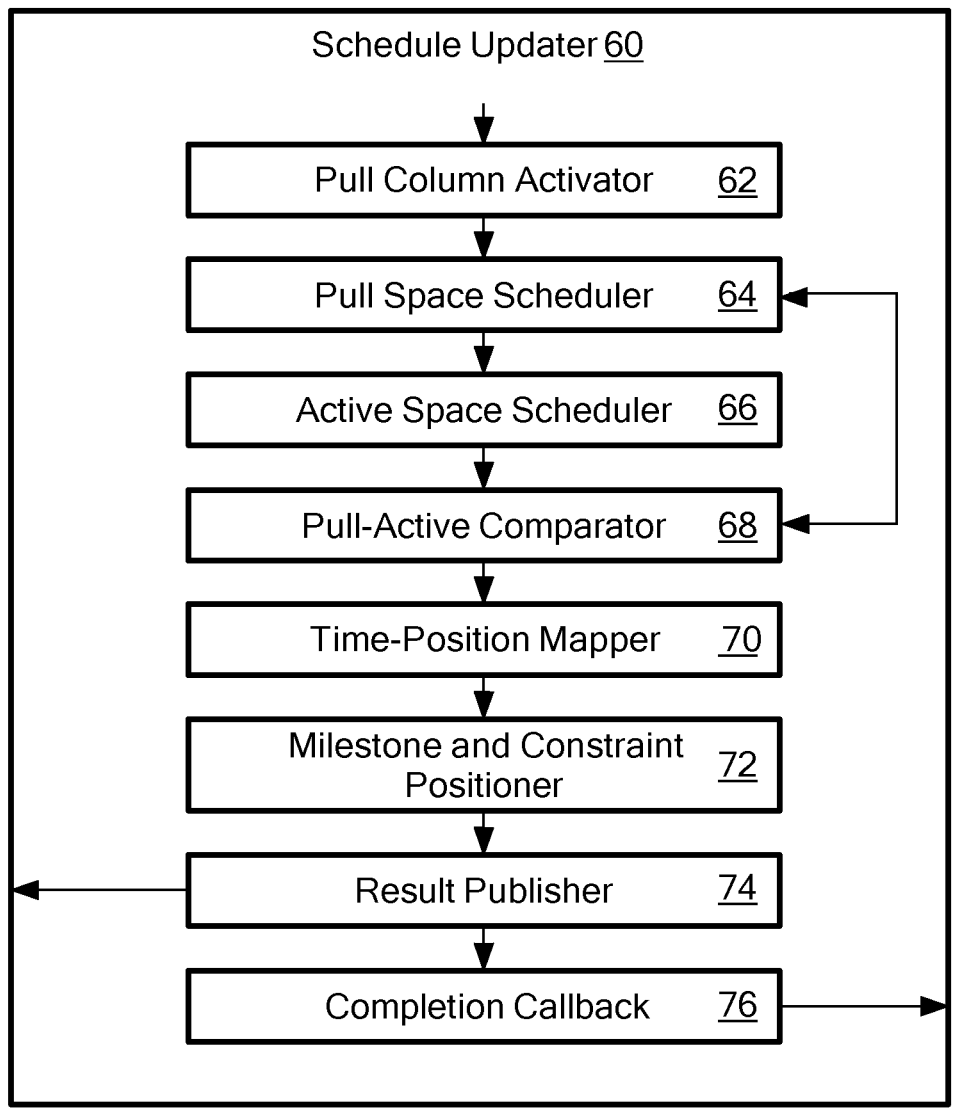
FIG. 2A is a block diagram of a schedule updater of the plan schedule service of FIG. 2.

Now referring to FIG. 2A, a schedule updater 60 includes a pull column activator 62, pull space scheduler 64, an active space scheduler 66, a pull-active comparator 68, a time-position mapper 70, a milestone and constraint positioner 72, a result publisher 74 and a completion callback 76. The schedule updater 60 may the same as the schedule updater 50 discussed above with respect to FIG. 2.

In an embodiment, the pull column activator 62 may activate a pull-column responsive to new ticket and/or schedule information that is received. The ticked and/or schedule information may include a new ticket and/or updates to existing tickets. The schedule updater 60 may determine whether the new tickets or updates to existing tickets impacts a pull space or an active space. If the modification is to a pull space, the pull space scheduler 64 may schedule the ticket into the appropriate pull space pull column. If the modification is to an active space, the active space scheduler 66 may schedule the ticket into the appropriate active space pull column.

In an embodiment, the pull-active comparator 68 can determine if the plan is behind schedule, on schedule or ahead of schedule. If the plan is behind schedule, the pull-active comparator 68 may modify the schedule (re-schedule tickets) using the pull space scheduler 64 and a date later than the target milestone.

In some embodiments, responsive to any modification of a particular plan, the time-position mapper 70 may calculate display positions of the new milestone dates, constraints, and any other external dates. In some embodiments, the milestone and constraint positioner 72 calculates display positions of the new milestone dates, constraints, and any other external dates. The result publisher 74 may publish as message to an input interface representing all the schedule related updates that the schedule updater 60 and its components have calculated. In an embodiment, the asynchronous completion callback 76 can record locally when the published result message is acknowledged by the input interface.

Figures 3, 4:
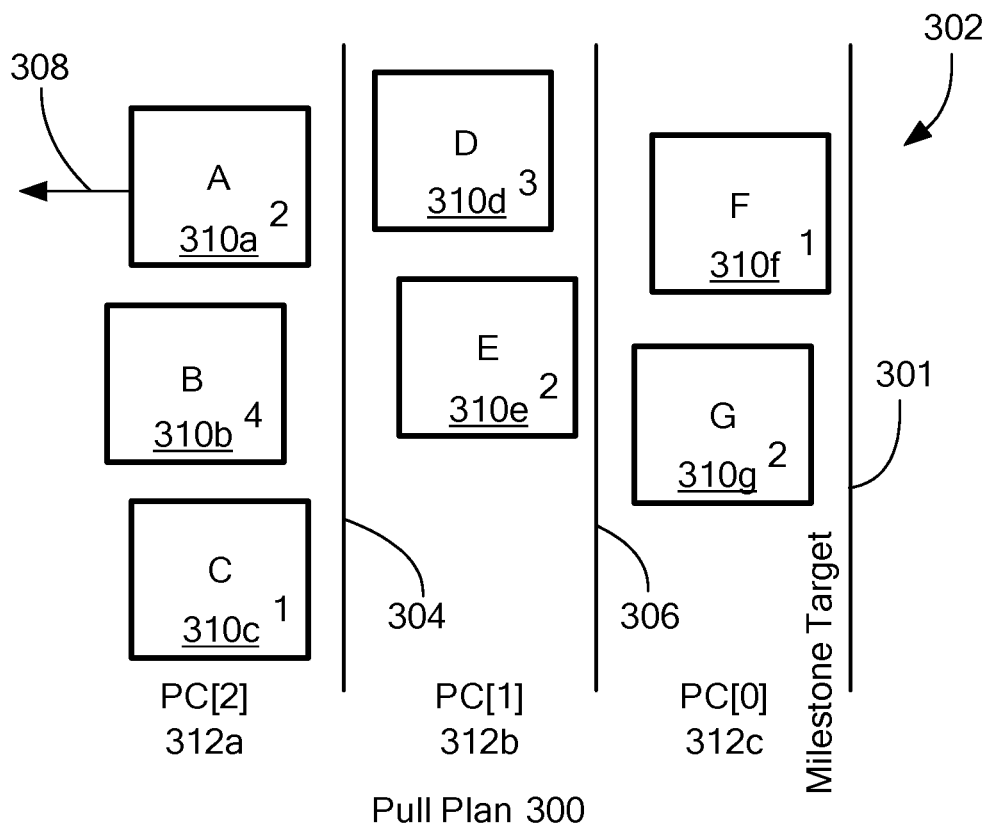
FIG. 3 is a graphical representation of tickets and their relative positions in a particular pull plan.
FIG. 4 is a table Showing a range of positions relative to an x-axis of the tickets in the pull plan of FIG. 3.

Now referring to FIG. 3, a pull plan 300 is displayed on a visual field 302 represented by a graphical display. The pull plan 300 includes a plurality of tickets 310a-310g positioned within different pull columns 312a-312c based on a respective position value associated with each ticket 310a-310g. For example, the position value may correspond to a position along an x-axis of each ticket 310 within a respective pull column 312. In some embodiments, the position value may be referred to as a left edge value of the ticket. In a particular pull column, some tickets 310 may be offset with respect to another ticket 310 in the same pull column 312. Further, and as illustrated in FIG. 3, each of the tickets 310a-310b and the pull columns 312a-312c are organized according to a milestone target 301. In an embodiments, the milestone target 301 is a completion date for the pull plan 300. It should be appreciated that although FIG. 3 illustrates only seven tickets and three pull columns, a pull plan may contain any number tickets and/or pull columns based on the number of tasks for a pull plan and the duration of the pull plan.

In an embodiment, the pull plan 300 is a simplified pull plan depicted on a graphical computer user interface (e.g., message service 14 of FIG. 1). The graphical interface may, in embodiments, be displayed in a web browser. The pull plan 300 has an associated space of at least two dimensions, namely the visual field 302 represented by the graphical display. Equivalent embodiments include any graphical interface capable of rendering visual images or at least two dimensions.

In an embodiment, the milestone target 301 may have a date associated with it, in which case planned dates are calculated relative to this date. The date may be a completion, date for the project, a milestone date of the project, or another date associated with the project. Completion dates for each of the tithes 310a-310g may be calculated relative to the milestone's date. In some embodiments, if the milestone target 301 has no specific date, planned dates may be calculated relative to the undated milestone (milestone minus 1 day, milestone minus 2 days, etc).

Tickets 310a-310g may be depicted as shapes of at least two dimensions that can be positioned within the space of the plan, here shown as squares which are positioned in the X-Y plane of the display. Each ticket 310 may have an associated duration, here shown as an integer in the lower right corner of the ticket shape. For example, a first ticket 310a (i.e., ticket A) has the number 2 in the lower right hand corner, indicating that the task associated with the first ticket 310a may require 2 days to be completed. The ticket shapes may be rendered in the graphical interface by any commonly used techniques, including vector or raster images, scalable vector graphics (SVG), cascading style sheets (CSS), HTML5 Canvas elements, etc.

In an embodiment, a user may perform various operations via the graphical user interface (e.g., input interface, message service) to create and manipulate the pull plan 300 and one or more of the tickets 310a-310g within the pull plan 300, including creating and destroying plans, labeling and assigning a date to the plan milestone, adding and removing tickets to the plan, positioning tickets in the X-Y plane 302, assigning durations to tickets, and assigning other attributes to tickets such as an activity name, required resources, required team members, dependencies to other tickets or dates, etc. Any of various techniques might be used to manipulate this graphical representation including drag-and-drop or the use of touch gestures on a touch enabled graphical device such as a desktop computer, laptop computer, tablet, smart phone, etc. For example, the user may mouse-click a ticket 310 and move it from one pull column 312 to another, change its location within a pull column 312, delete the ticket 310, add a new ticket 310, etc.

In the illustrative embodiment of FIG. 3, the pull column partitions 312a-312e of the pull plan 300 are labeled as PC[2], PC[1], and PC[0] respectively, where values 0, 1, and 2 are the pull column indices of the respective pull columns 312. Assuming that the left edge of each ticket 310 is assigned an X value in plane 302 and each ticket 310 has a width W, then the X range of a ticket 310 is given by the range [X, X+W] or, equivalently [X, X+W+1). For example, an example X range values for the tickets 310a-310g of FIG. 3 is provided in the table of FIG. 4. In an embodiment, the widths of tickets 310 in the pull plan 300 is not representative of the duration of a task associated with the ticket 310. For example, in one embodiment, tickets 310 in the pull play 300 may have the same width. In another embodiment, tickets 310 may have different widths based on ticket attributes such as resources needed, team members associated with the ticket, relative importance to the team of planners, etc.

To organize tickets 310 within the pull columns 312, embodiments described herein include pull scheduling methods that comprises (a) partitioning tickets into pull columns, (b) scheduling (i.e. calculating planned dates) of the pull columns, and (c) scheduling (calculating planned dates) of the tickets in each pull column.

For example, in one embodiment, the pull column partitioning may be calculated as follows.

A pull plan system, such as pull plan system 10 of FIG. 1, may scan right to left along the X axis of the pull plan 300, considering each distinct X left edge value of the tickets 310 in the pull plan 300. The system may identify each such value X such that no ticket 310 has an X range [X', X'+W'] that covers the value X−1. In other words, the system may identify vertical lines in plane 302 (such as vertical lines 304 and 306) where the line does not pass through any tickets 310. Each line (e.g. 304 and 306) may define the inclusive left (start) boundary of a pull column 312. That is, pull columns 312 may be bounded by all the vertical areas of the pull plan 300 that are empty of tickets. Thus, in some embodiments, a user may define pull columns 312 by moving the tickets 310 to create or remove vertical lines that do not pass through tickets 310. If, for example, the first ticket 310a (i.e., ticket A) were moved to the left in the direction of arrow 308 so that there is a space created between the first ticket 310a and second and third tickets 310b, 310c (i.e., tickets B and C), the system may identify such space as another vertical line and define another pull column 312 comprising the ticket 310a. In an embodiment, all the tickets 310 appearing between two adjacent pull column boundaries (e.g. two adjacent vertical lines) are assigned to the same pull column index. Each pull column partition consists of all the tickets 310 that belong to that pull column 312.

Figure 5:
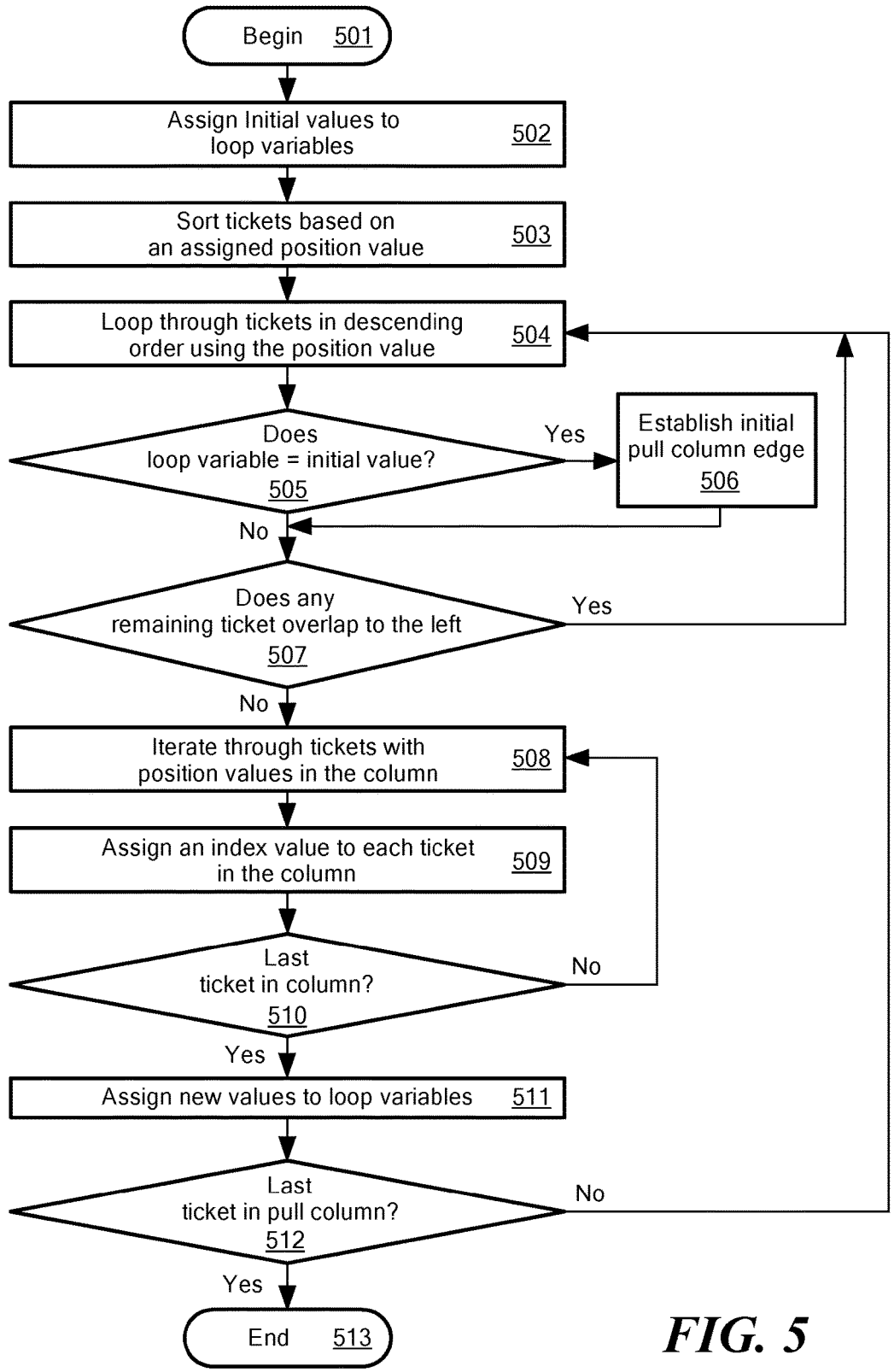
FIGS. 5-14 are block diagrams of different embodiments of a pull plan system.

Now referring to FIG. 5, a flow diagram (i.e., of method 500) is illustrated showing processing that can be implemented within one or more portions of a management system and in particular within one or more portions of a pull plan system such as the pull plan system shown in FIG. 1. Rectangular elements (typified by element 502 in FIG. 5), herein denoted "processing blocks," represent computer software instructions or groups of instructions. Diamond shaped elements (typified by element 505 in FIG. 5), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

In FIG. 5, a method 500 for assigning a pull column index (referred to as pc_i) to each ticket is depicted. In an embodiment, the method 500 may be executed by the components of the pull plan system 10 described above with respect to FIG. 1. At block 501, the process begins. At block 502, initial values are assigned to local variables pc_i and pc_edge. In an embodiment, pc_edge may refer to the rightmost edge position of a pull column within a pull plan. For example, pc_edge may refer to the left edge value of the rightmost ticket in the pull column.

In some embodiments, the initial values may be input parameters entered through an input interface of a pull plan system. The input parameters can include ticket information, such as a position value of a ticket within a pull plan. The position value may correspond to a left edge value of a ticket along an x-axis or a range of x-values (e.g., distance from a left edge to a right edge, start position to an end position) defining a width of the respective ticket in some embodiments, the pull plan may be a graphical representation initially having no defined column or row boundaries (e.g., no strict spacing constraints). Thus, column and/or row boundaries may be determined subsequent to the placement of tickets in the pull plan.

In other embodiments, a pull plan may be a matrix of horizontal and/or vertical lines or schedule not having any date or time information. The initial values may be assigned by a user. For example, in one embodiment, a user can position a ticket on the pull plan using an input interface and the pull plan system can identify of position of the ticket (e.g., x-values, y-values on a grid). In other embodiments, the initial values are assigned by an administrator of the pull plan system. For example, the pull column partitioning engine can be configured to position a ticket on the pull plan. Each ticket may correspond to a task to be completed to reach the milestone target date. In an embodiment, the tickets may have an associated duration, a left edge value and a width.

The ticket information may be transmitted (e.g., published) from the input interface to a message service executing on a pull plan system. In some embodiments, the ticket information includes modifications to an existing pull plan, thus the message service can forward the ticket information to a scheduling service executing on a pull plan system. In some embodiments, the message service can transmit (e.g., broadcast) the ticket information to other clients (e.g., subscribers) using the corresponding pull plan and store the ticket information to a storage. In an embodiments, the scheduling service can be configured to update the existing pull plan based on the received ticket information. In other embodiments, the ticket information includes instructions for a new pull plan, thus the scheduling system can be configured to generate a new pull plan and generate one or more pull columns within the pull plan (i.e., schedule) responsive to the ticket information. In some embodiments, a pull column partitioning engine is configured to generate the one or more pull columns within the pull plan responsive to the ticket information. For example, the pull column partitioning engine may scan or otherwise process a pull schedule portion to identify position values of tickets in the pull plan that do not overlap with position values of any other tickets in the pull plan and define one or more columns with boundaries at the appropriate position values (e.g., x-values) that do not overlap with any tickets.

At block 503, each of the tickets in the pull plan are sorted in descending order based on their assigned position value. For example, the tickets may be sorted using their left X value. In some embodiments, the left X value may be defined by where a user placed the ticket in plane 302 of FIG. 3 and indicate a left most edge of the ticket along an x-axis.

In one embodiment, the sorting is accomplished by means of an index or property that is maintained on the ticket X values. For example, if the ticket is represented by a class or struct in a programming language, the X value may be stored in a variable, member variable, or other type of memory location associated with the class or struct.

In an embodiment, the scheduling service (pull column partitioning engine) can be configured to determine positions for one or more pull columns of a pull plan and to determine the membership of one or more tickets to each such pull column. In some embodiments, the pull column position is determined relative to a milestone target date or relative to an active line. The active line may define a boundary between an active schedule portion and a pull schedule portion. In some embodiments, a pull column assigning engine may assign the one or more tickets to a pull column based on the ticket's corresponding position value.

For example, at block 504, a loop begins over the tickets in descending order based on each tickets respective position value (e.g., x value). At block 505, the method compares the first tickets position value to the initial value of a loop variable to identify the largest position value of any ticket in the plan. The method may determine if pc_edge is null. If yes, at block 506, the local variable pc_edge is assigned the largest ticket X value in the pull plan. In an embodiment, this establishes a loop invariant value for the initial iteration of the block 504 loop. If no, at block 507, the method can determine if the position values of any of the remaining tickets overlap with a value just to the left of the current ticket position value and thus, determine if the current ticket position value defines the leftmost edge of a pull column. For example, it can be determined whether there is any ticket T2 in the plan such that the current loop iteration value T1.X.−1 is between T2.X and T2.X+T2.W, where T1.X is the left edge of ticket T1, T2.X is the left edge of ticket T2, and T2.W is the width of ticket T2. That is to say, the system determines whether T1.X−1 lies between the left and right edges of T2. If there is such a T2, then the loop continues at block 504. In one embodiment, block 507 is performed by a self-join on the sorted tickets of block 503.

If block 507 returns "no," then the current iteration T1.X defines the left edge of a pull column and the local variable pc_edge defines the maximum ticket left X value for any ticket in the pull column. At block 508, the method iterates through the tickets having position values between the identified boundaries of the pull column. For example, the method can iterate over all the tickets in the current pull column, namely those having an X value between the current T1.X and the current pc_edge. In an embodiment, the block 508 iteration might also be performed by a self-join on the sorted tickets of block 503. At block 509, an index value corresponding to the pull column index is assigned to each ticket in the pull column. For example, each ticket is persistently assigned the current pc_i value to indicate the index of the pull column to which it belongs. At block 510, the method determines if there any more tickets in the current pull column, any more tickets having position values associated with the current pull column being analyzed. If there are more tickets, the loop continues at block 508. If method has reached the last ticket in the respective pull column, the current iteration terminates at block 511. At block 511, the system assigns new values to loop invariants pc_i and pc_edge by incrementing pc_i and taking the pc_edge value of the next pull column, if any, to be the current value of T1.X−1. At block 512, method determines is there are any more tickets in the pull plan to analyze. If yes, the outermost loop continues at block 504, thus starting over for the next pull column in the pull plan. If the method has readied the last ticket in the pull plan, the method terminates at the terminal of block 513.

In an embodiment, the one or more tickets may be displayed in the one or more pull columns of a pull plan according to their respective left edge value. In some embodiments, the pull plan is displayed to a user through an output interface and is replicated in real time on one or more computers communicating over a network. Thus, each user of the pull plan can see modifications to the pull plan by others users as they happen in real-time.

In an embodiment, using this method 500 may obviate the need for the tickets in the graphical representation of the pull plan to be aligned in columns by means of a constraint or by means of a snap-to-column type of graphical positioning method. That is to say, the user is free to position tickets graphically in the X-Y plane completely by freehand, without any columnar constraints imposed by the system. The system may then define columns based upon the placement of the tickets. This property preserves the visual metaphor of sticky notes placed on a wall where there are likewise no columnar constraints on the placement of the sticky notes. In other embodiments, the system may define preset columns into which the user may place the tickets.

Once pull columns have been assigned to tickets in the plan, it is possible to determine planned start and planned finish dates for the tickets in the pull plan. In an embodiment, date and time information for a ticket, pull column and/or pull plan may be determined after the ticket information has been entered, the tickets have been sorted and one or more pull columns have been established. First, a pull column duration may be associated with each pull column. The pull column duration may be defined as the maximum duration of any ticket in that pull column. The planned finish date of a pull column P is the pull plan milestone (e.g., milestone 301 of FIG. 3) date minus the durations of all pull columns at lesser indices (e.g. all pull columns to the right of pull column P). For example, and briefly referring back to FIG. 3, the planned finish date of the third pull column 312c (i.e., PC[0]) is the milestone date 301, the planned finish date for the second pull column 312b (i.e., PC[1]) is the milestone date 301 less the duration of the third pull column 312c, and the planned finish date of the first pull column 312a (i.e., PC[2]) is the milestone date 301 less the sum of the durations of second and third pull columns 312b, 312c.

In some embodiments, the method 500 includes moving a ticket between different pull columns in the pull plan responsive to a user command (e.g., user dragging a ticket via a touch screen to a different pull column). For example, one or more tickets may be moved from the active schedule portion to the pull column in response to the user command. A pull column activation engine can be configured to move tickets from one or more selected pull columns to an active portion of the schedule. In some embodiments, the pull column activation engine can be configured to move tickets from an activated pull column to the active schedule portion, change the width of the tickets in the pull column to correspond to a duration of the ticket, and display the tickets with the changed width in the active schedule portion. A dependency engine of the pull plan system may maintain dependencies between tickets each or both of which is in the pull schedule space or the active schedule space.

In some embodiments, the pull column partitioning engine can be configured to establish a new pull column in response to a user moving a ticket to an unoccupied space or pull column in an existing pull plan. For example, the pull column partitioning engine can be configured to move a ticket from a first pull column to a second column in response to a user command. In some embodiments, the pull column assigning engine can be configured to assign the ticket to a position within the second column and establishing a new order in the second column responsive to the move. The pull column partitioning engine can be configured to collapse the first column responsive to the move when the first column has no tickets left and is empty, thus removing the first column from the pull plan (i.e., schedule).

In some embodiments, a user may move a border or boundary separating the active and pull portions of the plan. The repositioning of the active space border may result in a ticket being moved from active to pull portions or the reverse. For example, in some embodiments, the boundary separating the active portion from the pull portion may be moved to correspond to the position of the one of the pull column boundaries in response to a user command. Alternatively, the boundary between the active portion and the pull portion may be moved to change a position within the active schedule portion in response to a user command and thereby reassign zero or more tickets from the active portion to positions within one or more pull columns.

Figure 6:
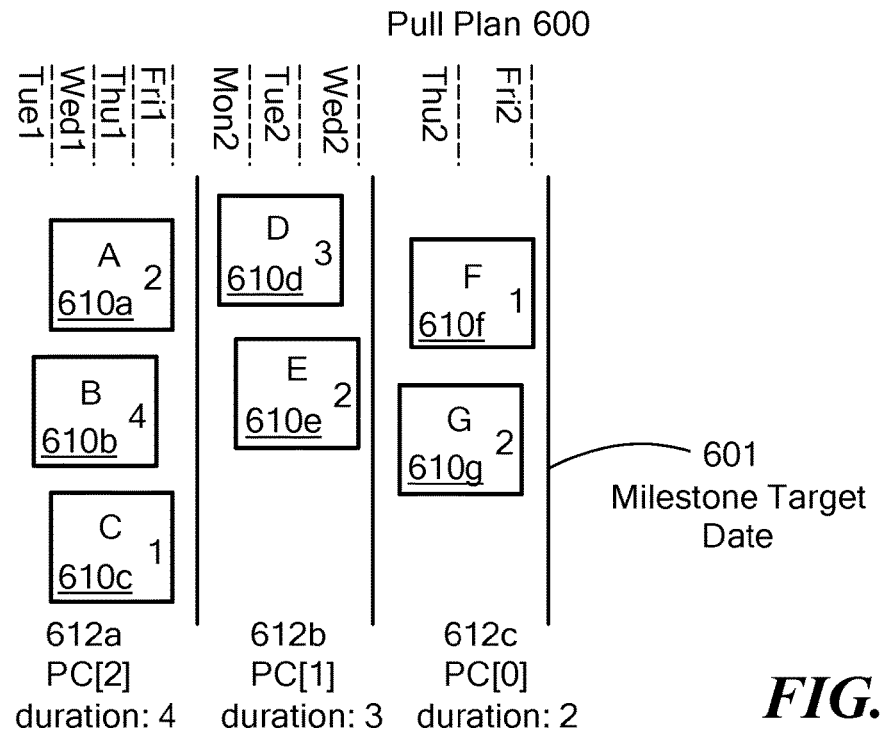

Now referring to FIG. 6, a pull plan 600 includes a plurality of tickets 610a-610g, (here seven), a plurality of pull columns 612a-612c (here three), and a milestone date 601. In an embodiment, the duration of pull columns 612a-612c includes work days (Monday through Friday excluding weekends) and the pull plan milestone 601 is assigned to a second Friday (i.e., Fri2). Here, the first pull column 612a (i.e., PC[2]) finishes on Friday of week 1 (i.e., Fri1) because the third pull column 612c (i.e., PC[0]) finishes on the milestone date 601 (i.e., Fri2) and has duration 2 work days, and the second pull column 612b (i.e., PC[1]) has duration 3 work days. Therefore, the first pull column 612a finishes on the first Friday (milestone less (3+2) work days).

In an embodiment, responsive to the pull columns 612a-612c being established, planned start and planned finish dates may be assigned to each of the tickets 610a-610g. In an embodiment, the planned finish of each ticket 610 in the pull plan 600 is the finish date of the pull column 612 to which the respective ticket 610 belongs. In another embodiment, planned finish dates of tickets 610 having a duration less than the duration of their respective pull column 612 might be offset from the pull column finish date by any duration value less than the difference between the pull column duration and the ticket duration. Such offsets might be applied by the system or by the user according to the embodiment. In any case, a constraint may be enforced which requires that no ticket 610 have a planned finish later than the finish date of the pull column 612 to which it belongs and no ticket 610 have a planned start date earlier than the finish date of the prior pull column 612. For example, a constraint may require that a fourth ticket 610d (i.e., ticket D) may not have a planned finish date later than the finish date of the second pull column 612b (i.e., PC[1]) and may not have a planned start date earlier than the finish date of the first pull column 612a (i.e., PC[2]). Thus, in FIG. 6, a first ticket 610a (i.e., ticket A) might have a planned start date as earlier as a first Tuesday (i.e., Tue1) and as late as a first Thursday (i.e., Thu1) of the pull plan 600, since the first ticket 610a has duration of 2 and must have a planned finish date no later than a first Friday (i.e., Fri1) of the pull plan 600.

In an embodiment, pull columns 612 may be activated by a user. When a user activates a pull column 612, the tickets 610 in the pull column 612 may be moved to an active schedule space. In some embodiments, the tickets 610 may be arranged in a Gantt chart format showing the duration, start, and end dates of the ticket.

Figure 7:
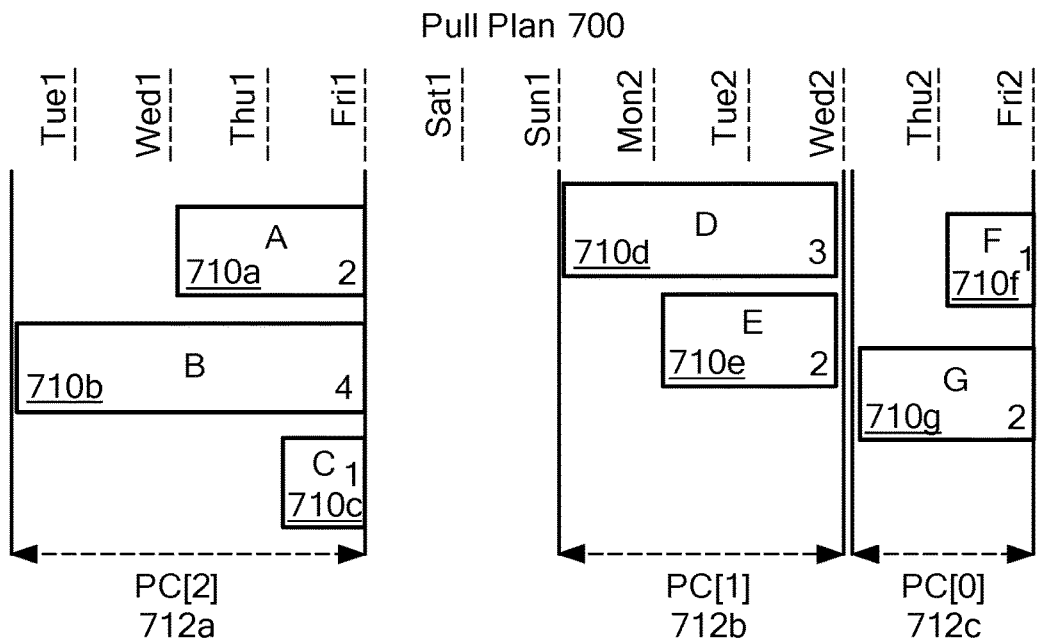
Figure 8:
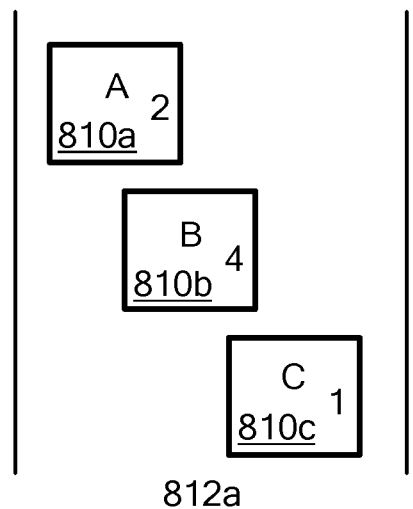
Figure 9:
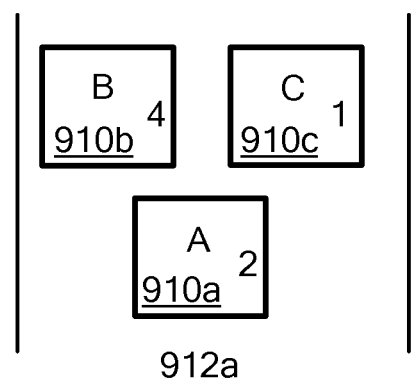

Now referring to FIG. 7, a pull plan 700 includes a plurality of tickets 710a-710g and plurality of pull columns 712a-712c. In an embodiment, assignments of planned start and finish dates to tickets 710 in each of the pull column's 712 upon activation of a particular pull column 712 is illustrated in FIG. 7. Each ticket 710 may be assigned an end date that corresponds to the end date of a pull column 712, so that all the tickets 710 in the pull column 712. When viewed in the active space, have a right edge that aligns with the finish date for the pull column 712. For example, tickets illustrated in FIG. 7, are right-aligned within the time period represented by their respective pull columns 712. After the tickets 710 are right-aligned in the active space, a user can move the tickets 710, subject to scheduling constraints, within the active space. For example, the first pull column 712a (i.e., PC[2]) has a duration of four days, whereas a third ticket 710c (i.e., ticket C) in the first pull column 712a has a duration of one day. A user may move the third ticket 710c left and right within the four-day duration as desired.

In some embodiments, separate work calendars might be recorded for different resources involved in the pull plan 700 (e.g., project), where work calendars define work days, holidays, numbers of work shifts, etc. By associating tickets of the pull plan 700 with resources it is also possible to schedule both pull columns 712 and tickets 710 within a pull column 712 to accommodate the work calendars of the resources to which the tickets 710 are associated.

In embodiments, all the tickets 710 in a given pull column 712 do not necessarily need to overlap on a common X value. For example, the vertical Y position of a ticket 710 may not affect the determination of its planned start or finish dates. In an embodiment, the system may include some portion of the tickets 710 that overlap in order for the tickets 710 to define a pull column 712. For example and referring briefly to FIG. 8, the arrangements of first, second and third tickets 810a, 810b, 810c (i.e., tickets A, B, and C (in the first pull column 812a (i.e., PC[2]) may result in the same scheduling of planned ticket dates for those tickets 710 as is illustrated in FIG. 7. Similarly and referring briefly to FIG. 9, the arrangements of first, second and third tickets 910a, 910b, 910c (i.e., tickets A, B, and C in the first pull column 912a) may result in the same scheduling of planned ticket dates for those tickets 710 as is illustrated in FIG. 7. In some embodiments, a Y position of a ticket 710 or relative positions of tickets 710 within a pull column 712 or other derived or user assignable attributes of a ticket 710 might be defined to affect the scheduling of tickets 710 within the pull column 712.

Figure 10:
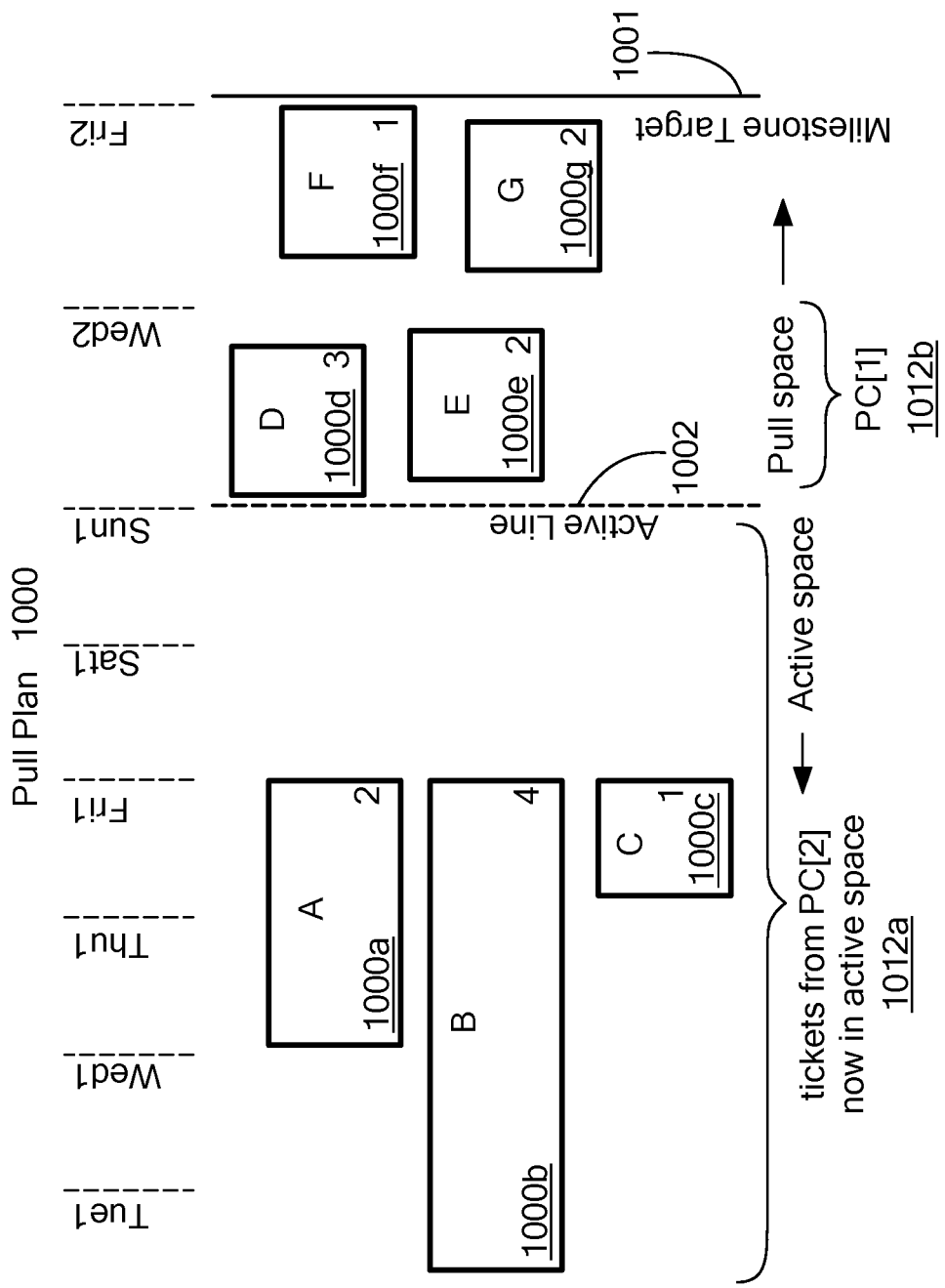

Now referring to FIG. 10, a pull plan 1000 having a milestone date of 1001 includes a plurality of tickets 1010a-1010g positioned within one of a plurality of pull columns 1012a-1012b. In an embodiment, the pull plan 1000 may include Matures for activating a pull column 1012. For example, if not specified explicitly, the pull column index may the highest pull column index in the pull plan 1000, that is to say it identifies the leftmost pull column 1012 in the pull plan 1000. The leftmost pull column, here first pull column 1012a, generally represents the next pull column 1012 in the pull plan 1000 (i.e. the pull column that includes tasks that are to be started and/or completed next). In some embodiments, the activate-pull-column operation can be invoked explicitly by the user or automatically by the system, such as by a scheduling service 10 or pull plan activation engine 22 as illustrated in FIG. 1. For example, the system may activate the next pull column 1012, such as second pull column 1012b, if the present date coincides with the start date of the second pull column 1012b.

In some embodiments, the first time a pull column 1012 is activated, the system may partition the X-Y visual display plane of the pull plan 1000 into an active space and a pull space by identifying a pair: (activeLineX, activeLineDate). In the illustrative embodiment of FIG. 10, the active space corresponds to first pull column 1012a and the pull space corresponds to the second pull column 1012b. A value of an active line 1002 (i.e., activeLineX) may define boundary between the active space 1012a and the pull space 1012b, which might be specified in terms of an absolute calendar date or a relative date from the pull plan milestone 1001.

In an embodiment, the active line 1002 value identifies an X value of the plan's X-Y plane such that points with X values less than the active line 1002 are in the active space 1012a and points with X values greater than the active line 1002 are in the pull space.

Both the initial invocation of activating a pull column 1012 and subsequent invocations can reposition one or more tickets 1010 in the activated pull column 1012 and any temporally prior pull columns 1012 from the pull space 1012b of the plan to the active space 1012a of the plan. In an embodiment, activation of a pull column 1012 repositions all the tickets 1010 in the pull column to an active space 1012a. Once positioned in the active space 1012a the left X position of a ticket 1010 determines its planned start date, but the X dimension in the active space 1012a provides a functional mapping onto the time dimension. That is to say, there may be a function of X values of the active space 1012a to planned date values such that f(x) uniquely determines a planned date. This may be referred to as a so-called active space schedule function. If this function is defined to also have a functional inverse, then it is also possible to place any date at some X axis location in the X-Y plane of the graphical representation of the pull plan 1000.

Notice that are many suitable such functions, which can have varying complexity. In one embodiment the function applied linearly maps X distance left of the active line 1002 to a corresponding date preceding the active date. For example, in one embodiment, in order to position dates uniformly 145 pixels apart, for instance, the function might be defined as:

$$f(x) = \text{activeLineDate} - ((\text{activeLineX} - x)/145)$$

Notice that, in an embodiment, there is no such function of X alone to planned dates in the pull space 1012b. A given X position that intersects all the first, second, and third tickets 101a, 101b, 1010c in FIG. 10, for example, might correspond to any of the dates that the first pull column 1012a spans, because planned dates are calculated based on the pull column 1012 as previously described.

This property of X mapping to time in the active space 1012a also makes it possible to assign widths to tickets 1010 that correspond to their durations so that the left edge of a ticket 1010 maps to its planned start date and the right edge maps to its planned finish date. In short, the active space 1012a behaves like a traditional linear depiction of a calendar.

In an embodiment, when the activate-pull-column operation is performed, tickets 1010 formerly in pull space 1012b which are moved to the active space 1012a by the operation are positioned by the system in the active space 1012a such that their new active positions would yield the same planned start and planned finish dates as they had when in the pull space 1012b. In short, activate-pull-column preserves the planned dates of tickets 1010 which are thereby moved from the pull space 1012b to the active space 1012a. Henceforth, manual repositioning of tickets 1010 by the user affects their calculated schedules according to whether the ticket 1010 is repositioned into the active space 1012a or the pull space 1012b. In another embodiment, when a pull column 1012 is activated, the system may automatically rearrange the start and end dates of some tickets 1010 within the start and end dates of the pull column 1012 as defined by system settings or constraints.

In an embodiment, a general ticket scheduling method is therefore as follows: Except when performing the active-pull-column operation, when a ticket 1010 is placed into a new target position in the active space 1012a, then the active space schedule function is applied to the new position of the ticket 1010 to determine its planned start date (if it has a duration then its planned finish date is also calculated). For example, the start date of the active ticket 1010 may be defined by the placement of the ticket 1010 by a user. When the ticket 1010 is positioned with a new target position in the pull space 1012b, than the previously described pull scheduling method can be used to schedule all the tickets 1010 in the pull space 1012b including the newly placed ticket 1010. In other words, the start, end dates, and/or duration of the pull column 1012 may be defined by the start dates, end dates, and durations of tickets 1010 within each pull column 1012.

In FIG. 10, the activate-pull-column has been performed on first pull column (i.e., PC[2]). The result is that first, second and third tickets 1010a, 1010b, 1010c formerly of the first pull column are in the active space 1012a the first pull column is now the active space). The active line 1002 has been introduced at a position equal to some value at or to the left of the left boundary of second pull column 1012b (i.e., PC[1]) and with the active line 1002 equal to some value between the finish date of the former first pull column 1012a and the start date of the second pull column 1012b. In an embodiment in which the time dimension represents work days, the active line 1002 might fall on a weekend as illustrated in FIG. 10.

Since X position alone in the active space 1012a can uniquely determine a date, it is a straightforward matter for the user to fine tune the scheduling of tickets 1010 in the active space 1012a simply by repositioning them in the same manner normally used with a graphical calendar. In this case the system simply applies the active space scheduling function to the new position in order to determine a new planned date. This is in contradistinction to the repositioning of tickets 1010 in the pull space 1012b, where the pull column partitioning and durations of other tickets 1010 in a given pull column 1012 can have non-obvious effects on the planned dates assigned to a repositioned ticket 1010.

Tickets 1010 can also be repositioned from either side of the active line 1002 to the other, as by drag and drop or other common methods. Since the system uses the location of the ticket 1010 in active space 1012a or the pull space 1012b to determine the scheduling method that is applied to it, once a ticket 1010 in the active space 1012a is moved to the pull space 1012b, the pull scheduling method henceforth applies to it (which requires reference to the positions of other tickets 1010 in the pull space 1012b). Conversely, a ticket 1010 moved from the pull space 1012b to the active space 1012a is henceforth scheduled by application of the active space schedule function.

In an embodiment, once the active line 1002 has been introduced, the user may modify either the x position or the value of the date of the active line 1002 or both. For instance, if new tickets 1010 are introduced to the pull space 1012b of the pull plan 1000 or moved from the active space 1012a to the pull space 1012b, it may be desirable to move the value of the date of the active line 1002 earlier in the calendar so as to accommodate additional time in the pull space 1012b while holding the milestone target date 1001 fixed. In another embodiment, work in the active space 1012a of the pull plan 1000 may require moving the value of the date of the active line 1002 forward in the calendar in order to postpone the start of the pull space 1012b portion of the pull plan 1000. It should be obvious that modifications to the active line 1002 can easily be made by ordinary graphical interface means such as drag and drop or use of a date picker.

For example and briefly referring back to FIG. 9, first, second and third tickets 910a-910c may have the same planned finish dates since they are members of the same pull column 912a, despite the fact that the right edge of the second ticket 912b is left of the left edge of the third ticket 912c.

Referring back to FIG. 10, although the pull column scheduling method is useful during the Lean pull planning process, the schedule it produces is effectively of coarser granularity than other types of schedules which may be used once work items are either in execution or near to being in execution. The more traditional calendar oriented view of the active space 1012a is more convenient for scheduling at or near the time that resources must be deployed and work progress monitored during project execution. The properties of tickets 1010 as represented in the active space 1012a are also amenable to traditional non-Lean scheduling methods such as critical path method (CPM) scheduling, sometimes referred to as a push style scheduling method, since it works forward from start dates rather than backwards from finish dates as in pull planning.

Embodiments may be entirely compatible with the capture and manipulation of additional project planning information such as precedence relationships, constraints, resource assignments, Gantt and PERT chart reporting, etc. Likewise, embodiments may be entirely compatible with the capture and manipulation of consumer-producer relationships between pull columns, tracking of external constraints, commitments to promise-by dates, reporting of Plan Percent Complete (PPC) results, N-week look ahead reporting, etc.

In an embodiment, precedence relationships may be maintained when a ticket 1010 moves from the pull space 1012b to the active space 1012a and vice versa. For example, for the second ticket 1010b representing a task or job, a user may define prerequisite tickets 1010 that must be completed prior to the task or job starting for the first ticket 1010b, and/or prerequisite tickets 1010 that must be completed prior to the task or job finishing. In an embodiment, when a ticket 1010 moves from the pull space 1012b to the active space 1012a, the prerequisite dependencies may be maintained. Likewise, when a ticket 1010 moves from the active space 1012a to the pull space 1012b, the dependencies may be maintained. If a user places a ticket 1010 in the active space 1012a, or in a column in the pull space 1012b that would violate the ticket's dependency, the system may highlight the error, reschedule the ticket 1010, and/or prevent the ticket 1010 from being placed in a position that would violate the dependencies.

Figure 11:
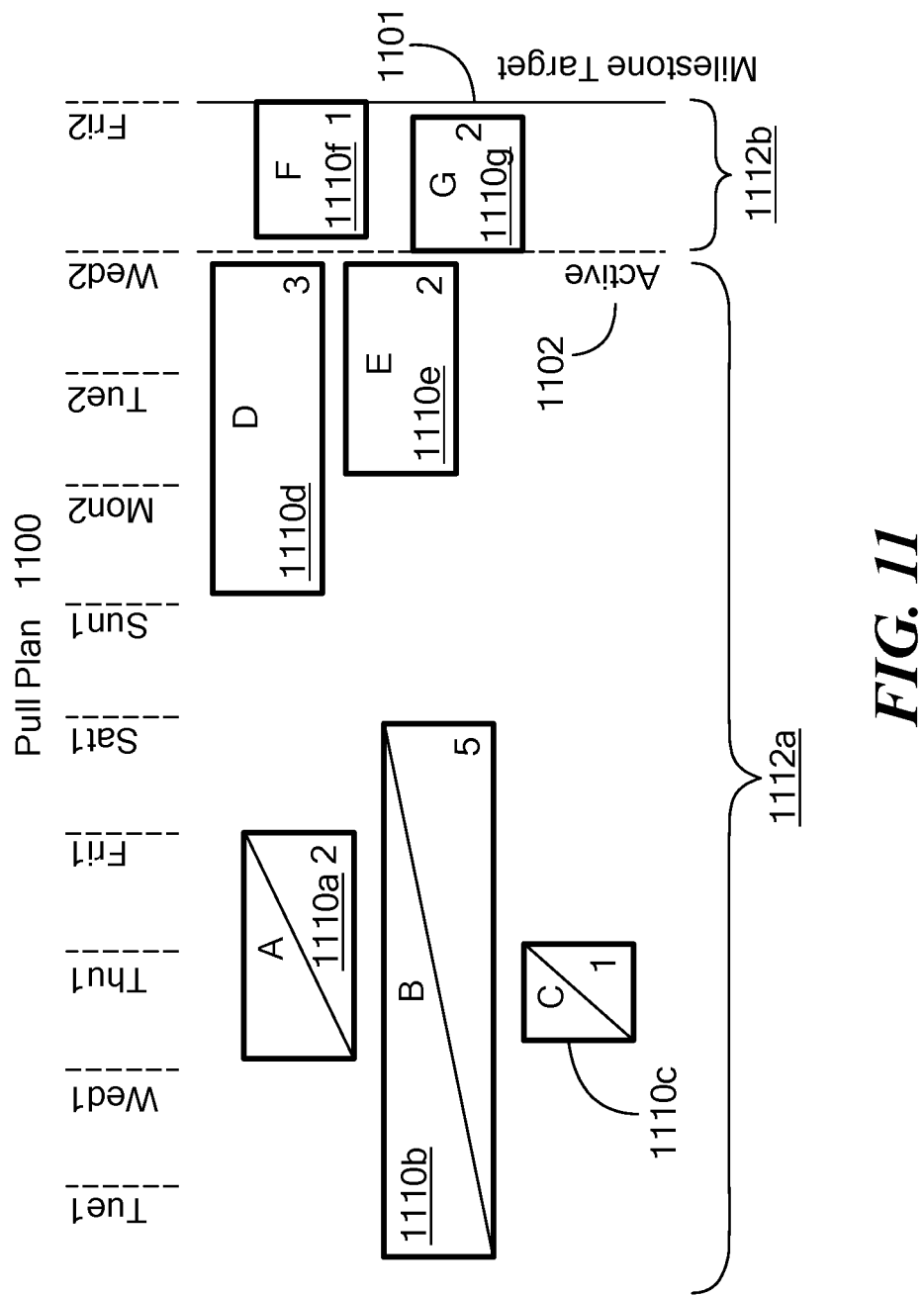

Now referring to FIG. 11, a pull plan 1100 has a milestone target date 1101 and an active line 1102 positioned some time period before. A first, second, third, fourth and fifth tickets 1110a-1110e are posited in an active space 1012a before the active line 1102. Further, a sixth and seventh ticket 1110f, 1110g are positioned in a pull space 1112b after the active line 1102 but before the milestone target 1101. In an embodiment, FIG. 11 depicts the result of modifying active second ticket 1110b (i.e., ticket B) by extending its duration by 1 day and finishing on a first Saturday (i.e., Sat1), modifying the third ticket 11100 (i.e., ticket C) by starting and completing it a day earlier than previously planned, and by marking first, second and third tickets 1110a, 1110b, 1110c as complete (signified by the diagonal line). These are typical modifications made during execution of the pull plan 1110. Moreover, the first pull column PC[1] has been activated, now referred to as the active space 1012a, placing fourth and fifth 1110d-1110e (i.e., tickets D and E) into the active space 1012a and repositioning the active line 1102.

Figure 12:
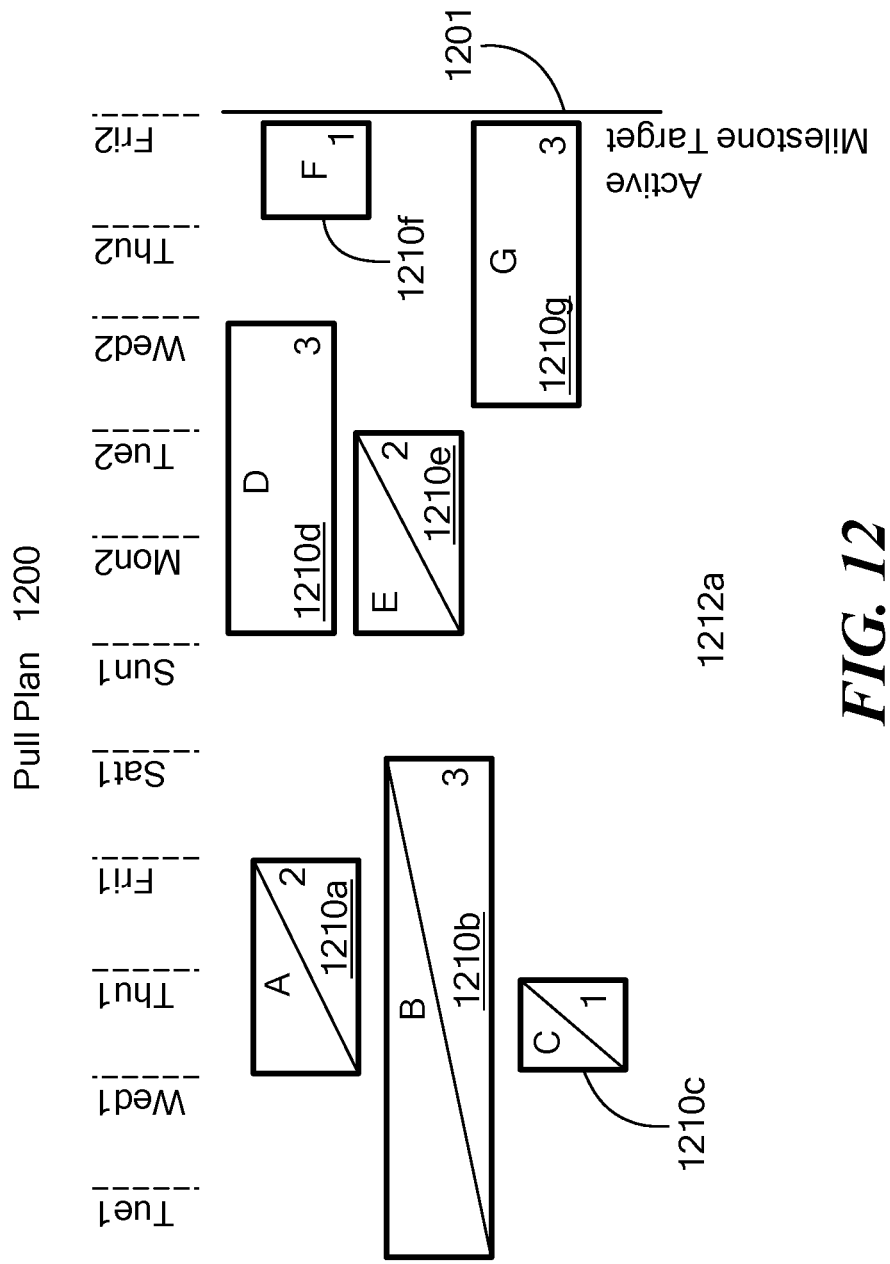

Now referring to FIG. 12, a pull plan 1200 includes a plurality of tickets 1210a-1210g and milestone target date 1201. In the pull plan 1200, an active line has been set as the same date as the milestone target date 1201. In an embodiment, a fifth ticket 1210e (i.e., ticket E) has been completed one day early. Thus, all of the pull columns are now in an active space 1212a positioned before the active line (here the milestone target 1021). Further, a sixth ticket 1210g has had its duration has been increased to 3 while holding its planned finish at the milestone target date 1201. Thus, in the illustrative embodiment of FIG. 12, the pull plan 12000 includes only active tickets 1210, as all the pull columns have been exhausted. Moreover, the pull plan 1200 is on schedule, that is the last planned finish dates of tickets 1210 in the pull plan 1200 correspond to the milestone target date 1201 as established when the active line was first established and tickets positioned in the active space 1212a. In some embodiments, two other conditions can arise, namely for the pull plan 1200 to get behind schedule or ahead of schedule.

Both of these conditions are supported by embodiments and can be depicted graphically in a prominent but easy to understand manner.

Figure 13:
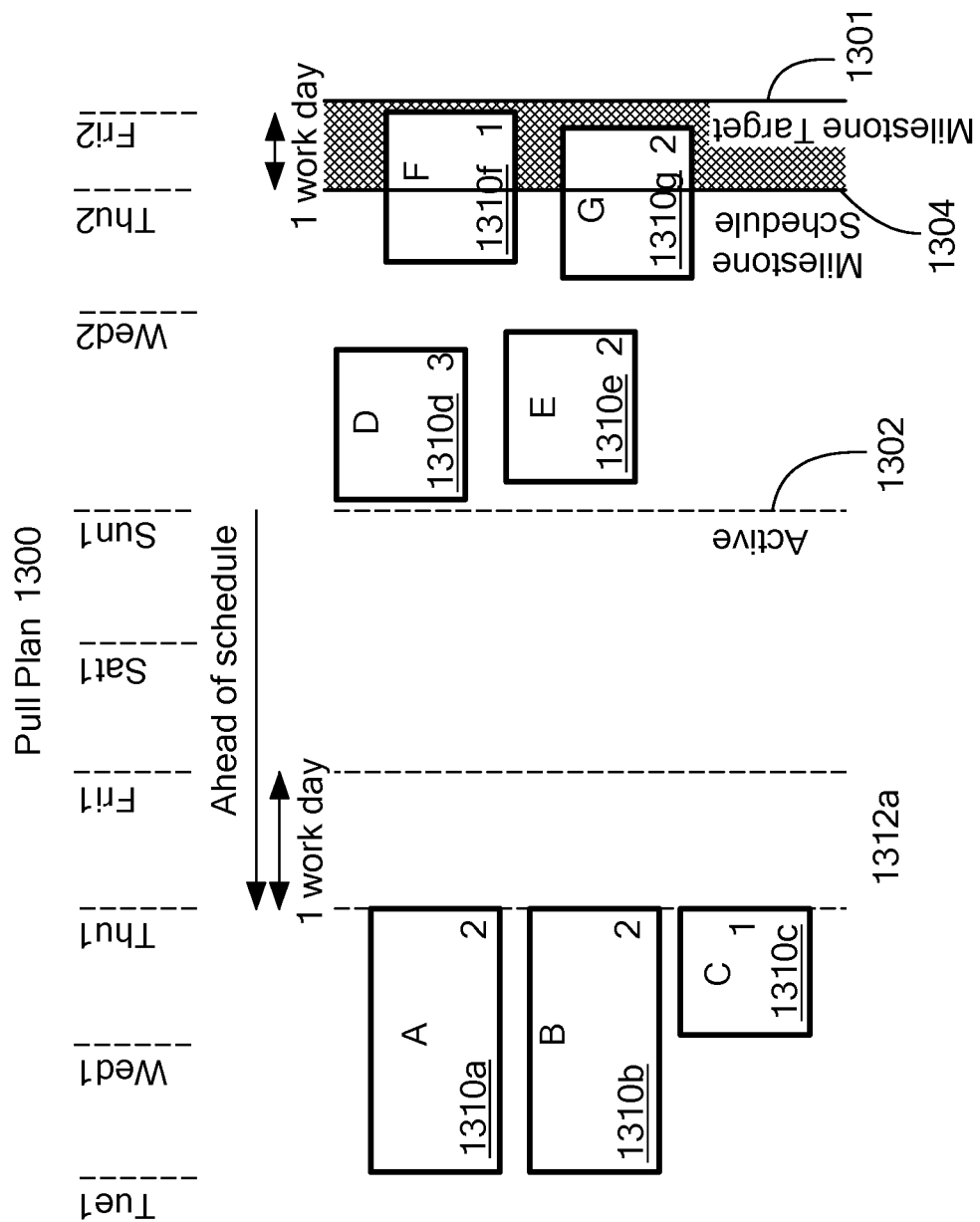

For example and referring to FIG. 13, a pull plan 1300 includes a plurality of tickets 1310a-1310g, an active line 1302, a milestone schedule date 1304 and a milestone target date 1301. In FIG. 13, first, second and third tickets 1310a, 1310b, 1310c (i.e., tickets A, B, C), subsequent to the conditions shown in FIG. 10, have been modified to all have planned finish dates of a first Thursday (i.e., Thu1) of the pull plan 1300, which is 1 day ahead of the schedule as shown in FIG. 10. As a consequence, the pull plan 1300 is ahead of schedule.

The trivalent plan condition of being (a) on schedule, (b) ahead of schedule, or (c) behind schedule may be determined by the system, such as by the scheduling service 16 or the pull column partitioning engine 18 of FIG. 1. An example of how the system may determine the trivalent condition follows.

Using the pull scheduling methods previously described, the system may determine the planned start date of the earliest (leftmost) pull column. This is the planned finish date of the pull column less the duration of the pull column. This may be referred to as the earliest planned pull date.

The system may then determine the maximum X value of the right edge of any ticket 1310 in the active space 1312a. This might be done by iterating over the tickets 1310, indexing ticket X ranges, or other well-known means.

Using the active space schedule function previously described, the system may determine the latest planned finish date of any active ticket 1310 from the value yielded above. In an embodiment, this may be referred to as the latest planned active date.

The system may then count the work days the intervening period between the two dates. If the number of work days is zero, then the pull plan 1300 is (a) on schedule. If the latest planned active date precedes the earliest planned pull date the then the pull plan 1300 is (b) ahead of schedule by the given number of work days. If conversely earliest planned pull precedes latest planned active, then the pull plan 1300 is (c) behind schedule by the given number of work days.

In FIG. 13, the pull plan 1300 is ahead of schedule 1 work day, and this condition is depicted graphically as shown. In particular, the milestone schedule line 1304 may be derived by subtracting the work days ahead of schedule from the milestone target date 1301. This represents the date at which the milestone could be reached if the entire pull plan 1300 were to be rescheduled 1 work day earlier. In an embodiment, the milestone schedule line 1304 is placed on the X axis somewhere in the plan at an X location that corresponds to the earlier date. In the illustrative embodiment of FIG. 13, it lies within the pull column that spans the schedule date.

The fact that the schedule line is left of the target line provides an obvious visual indicator of the ahead of schedule condition.

Figure 14:
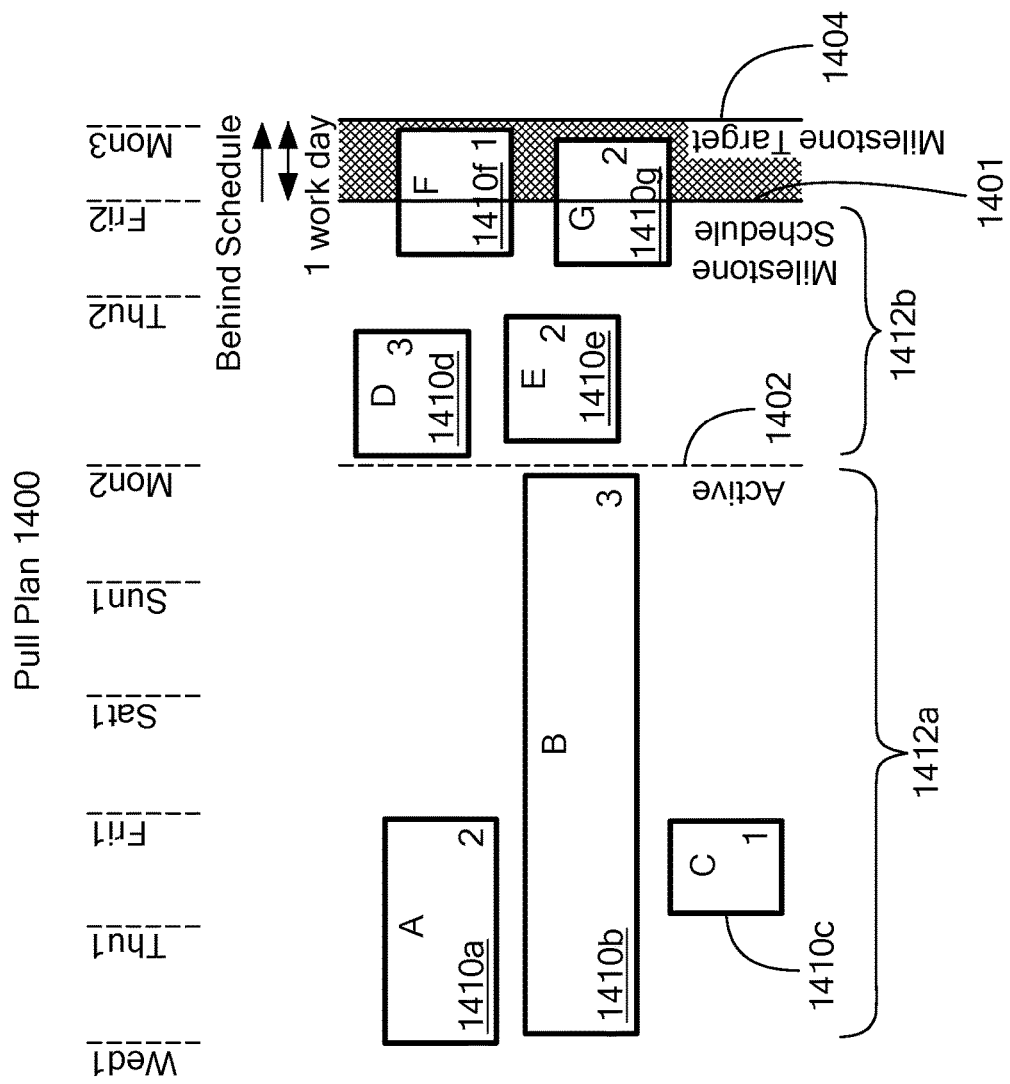

Now referring to FIG. 14, a pull plan 1400 includes a plurality of tickets 1410a-1410g, an active space 1412a, a pull space 1412b, an active line 1402, a milestone target date 1401 and a milestone schedule date 1404. In an embodiment, the pull plan 1400, subsequent to the conditions depicted in FIG. 10, is behind schedule by 1 work day. For example, a second active ticket 1410b (i.e., ticket B) has taken longer than previously expected and now is planned to finish on a second Monday (i.e., Mon2) o, where the second Monday is also the earliest planned pull date for the remaining pull space portion 1412b of the pull plan 1400 and the second Monday is a work day. Thus, the pull plan 1300 is behind schedule by 1 work day. In this situation, the milestone target date 1401 may be added to determine the new milestone schedule date 1404. The pull column calculation previously described may then be performed using this milestone schedule date 1404 as the terminal pull date, yielding a new pull schedule in which all pull planned dates are one work day later. The milestone schedule line 1404 may then be placed at the finish edge of the latest pull column and the milestone target line 1401 corresponding to the target date is placed in the pull plan 1400 at an X location corresponding to the earlier date. For example, in the illustrative embodiment of FIG. 14, the milestone target line 1401 lies again within the final pull column. The fact that the milestone target line 1401 is located to the left of the milestone schedule line 1404 provides an obvious visual indicator of the behind schedule condition.

Figure 15:
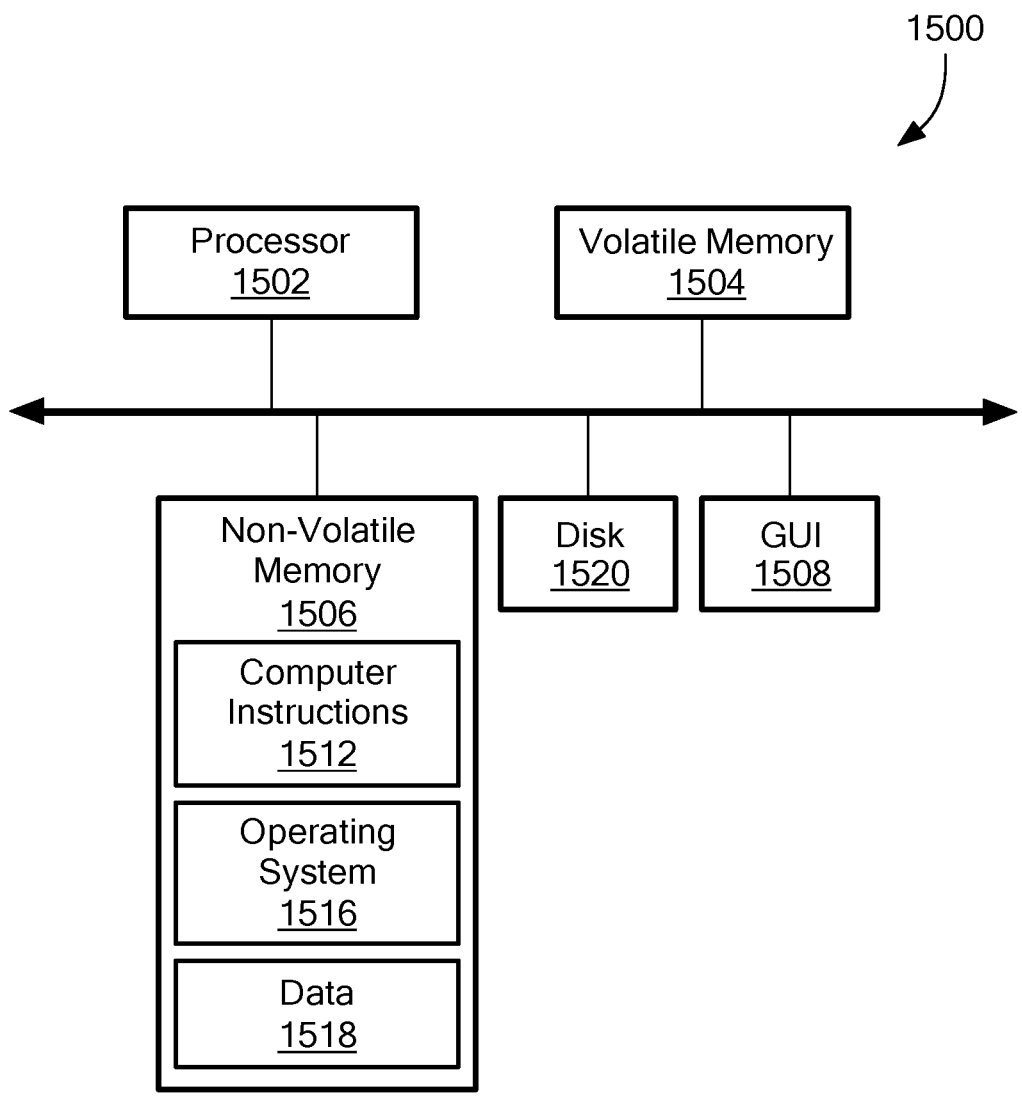
FIG. 15 is a block diagram of an embodiment of a computer system.

Referring to now FIG. 15, a computer 1500 includes a processor 1502, a volatile memory 1504, a non-volatile memory 1506 (e.g., hard disk), a graphical user interface (GUI) 1508 (e.g., a mouse, a keyboard a display, for example) and a computer disk 1520. The non-volatile memory 1506 stores computer instructions 1512, an operating system 1516 and data 1518 including a plurality of work tickets and work schedules, for example, in some embodiments, non-volatile memory 1506 includes a hierarchically organized collection of plan and ticket data as might be stored by a persistent messaging service. In one example, the computer instructions 1512 are executed by the processor 1502 out of volatile memory 1504 to perform all or part of the methods described herein with respect to FIGS. 1-14. For example, the computer instructions 1512 are executed by the processor 1502 out of volatile memory 1504 to perform all or part of the method 500 described above with respect to FIG. 5.

In an embodiment, computer 1500 may be the same as or substantially similar to the pull plan system 10 of FIG. 1. Computer 1500 may perform all of the same functions as the pull plan system 10 and all of its sub-components (e.g., message service 14, scheduling service 16, pull column partitioning engine 18, pull column assigning engine 20, pull column activation engine 22, dependency engine 24, output interface 26) and be configured to receive and generate the same data as pull plan system 10, as described herein. For example, computer 1500 may be configured to receive input parameters from one or more users and generate a new pull plan having one or more pull columns and one or more tickets. In some embodiments, computer 1500 may be configured to modify or update an existing pull plan responsive to input parameters received from a user. For example, the user may move a ticket to a new column, from an active space to a pull space or vice versa. Further, the user may modify dates and durations associated with tickets, pull columns or milestone dates of a respective pull plan.

The methods described herein are not limited to use with the hardware and software of FIG. 15; they may find applicability in any computing or processing environment and with any type of machine or set of machines that is capable of running a computer program. The methods may be implemented in hardware, software, or a combination of the two. The methods may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the various methods and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, solid state storage, or magnetic diskette) that is readable by a general or special purpose programmable computer for configuring and operating the computer when the storage medium or device is read by the computer to perform the various methods described herein. The methods may also be implemented as a machine-readable storage medium, configured with a computer program, where upon execution, instructions in the computer program cause the computer to operate in accordance with any of the method described herein.

In an embodiment, the methods described herein may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed:

1. A computer-implemented system for managing a pull-schedule comprising:
   a display replicated in real time on one or more computers communicating over a network;
   a schedule for completing at least one milestone, the schedule comprising an active schedule portion and a pull schedule portion;
   one or more tickets each of which can be represented in the active schedule portion or the pull schedule portion, each ticket comprising a task to be completed to reach the at least one milestone, the tickets having an associated duration and a left edge value, and a width;
   a pull column partitioning engine to scan the pull schedule portion to identify positions in the schedule that do not overlap with any tickets and define one or more columns with boundaries at the positions that do not overlap with any tickets;
   a pull column assigning engine to assign the one or more tickets in a column to the respective column; and
   a pull column activation engine to move tickets positioned within one or more pull columns to the active schedule portion, change the width of the one or more tickets to correspond to a duration of the ticket, and display the one or more tickets with the changed width in the active schedule portion.

2. The computer-implemented system of claim 1, wherein the pull column activation engine is configured to move the tickets of the one or more pull columns to the active schedule portion in response to a user command.

3. The computer-implemented system of claim 1, further comprising a dependency engine for maintaining dependencies between tickets each or both of which are in the pull schedule portion or the active schedule portion.

4. The computer-implemented system of claim 1, wherein the pull column partitioning engine is configured to establish a new column in response to a user moving a ticket to a position unoccupied by other tickets.

5. The computer-implemented system of claim 1, wherein the pull column partitioning engine is configured to move a ticket from a first pull column to a second column in response to a user command.

6. The computer-implemented system of claim 5, wherein the pull column assigning engine is configured to assign the ticket to a position within the second column, establishing a new order in the second column responsive to moving the ticket from the first pull column to the second column in response to the user command.

7. The computer-implemented system of claim 5, wherein the pull column partitioning engine is configured to remove the first pull column from the schedule when the first pull column has no tickets.

8. The computer-implemented system of claim 1, wherein the pull column partitioning engine is configured to assign a start date and a finish date to the one or more tickets without changing a position of the one or more tickets in their respective column.

9. The computer-implemented system of claim 1, wherein each pull column defines a specific time period.

10. The computer-implemented system of claim 1, wherein one or more tickets have the same width but different durations.

11. The computer-implemented system of claim 1, wherein one or more tickets have different widths, and wherein their respective width is based upon a ticket duration.

12. The computer-implemented system of claim 1, wherein one or more tickets have a different position in the column relative to another ticket in the same column, wherein the position of a ticket within the column is based upon a start date associated with the ticket.

13. A method for managing a pull-schedule comprising:
   displaying and replicating in real time, on one or more computer displays communicating over a network, a schedule comprising an active schedule portion and a pull schedule portion;
   receiving, by a computing device, input parameters through an input interface, the input parameters including ticket information for the schedule for completing at least one milestone, wherein the input interface is replicated in real time on one or more computers communicating over a network;
   generating, by a pull column partitioning engine, one or more pull columns within the schedule responsive to the ticket information, wherein the ticket information includes a position value for one or more tickets in the pull-schedule;
   determining, by a pull column assigning engine, positions for the one or more tickets within the one or more pull columns relative to an active line, the active line defining a boundary between the active schedule portion and the pull schedule portion, where each of the one or more tickets comprises a task to be completed to reach the at least one milestone, the tickets having an associated duration and a left edge value, and a width;

displaying the one or more tickets in the one or more pull columns according to each of the left edge value of the one or more tickets; and moving, by a pull column activation engine, tickets positioned within the one or more pull columns to the active schedule portion, changing the width of the one or more tickets to correspond to a duration of the ticket, and displaying the one or more tickets with the changed width in the active schedule portion.

14. The method of claim 13, further comprising establishing a new pull column in response to a user moving a ticket to an unoccupied position.

15. The method of claim 13, further comprising moving a ticket from a first pull column to a second column in response to a user command.

16. The method of claim 15, further comprising assigning the ticket to a position within the second column and establishing a new order in the second column responsive to the move.

17. The method of claim 15, further comprising removing the first pull column from the schedule when the first pull column has no tickets.

18. The method of claim 13, further comprising assigning a start date and a finish date to the one or more tickets without changing a position of the one or more tickets in in their respective column.

19. The method of claim 13, further comprising moving the one or more tickets within the one or more pull columns to the active schedule portion in response to a user command.

* * * * *